US009323741B2

(12) United States Patent  
Arnon

(10) Patent No.: US 9,323,741 B2  
(45) Date of Patent: Apr. 26, 2016

(54) SYSTEM AND METHOD FOR SEARCHING FUNCTIONS HAVING SYMBOLS

(75) Inventor: Adam Arnon, Jerusalem (IL)

(73) Assignee: EQSQUEST, Tel Aviv-Yafo (IL)

(*) Notice: Subject to any disclaimer, the term of this patent is extended or adjusted under 35 U.S.C. 154(b) by 222 days.

(21) Appl. No.: 13/883,283

(22) PCT Filed: Nov. 3, 2011

(86) PCT No.: PCT/IB2011/054892
§ 371 (c)(1),
(2), (4) Date: May 3, 2013

(87) PCT Pub. No.: WO2012/059879
PCT Pub. Date: May 10, 2012

(65) Prior Publication Data
US 2013/0226562 A1  Aug. 29, 2013

Related U.S. Application Data

(60) Provisional application No. 61/409,552, filed on Nov. 3, 2010.

(51) Int. Cl.
*G06F 17/21* (2006.01)
*G06F 17/27* (2006.01)
(Continued)

(52) U.S. Cl.
CPC ............ *G06F 17/2785* (2013.01); *G06F 17/10* (2013.01); *G06F 17/215* (2013.01); *G06F 17/2217* (2013.01); *G06F 17/277* (2013.01); *G06F 17/2715* (2013.01);
(Continued)

(58) Field of Classification Search
CPC ..................................................... G06F 17/215

USPC ................................................... 704/1, 9, 10
See application file for complete search history.

(56) References Cited

U.S. PATENT DOCUMENTS 5,544,262 A * 8/1996 Pagallo ........................ 382/189
2004/0114258 A1* 6/2004 Harris et al. ................. 359/841
(Continued)

OTHER PUBLICATIONS

Blostein D: "Recognition of Mathematical Notation", In: "Handbook of Character Recognition and Document Image Analysis", 1997, World Scientific, XP055053193, pp. 557-582.
(Continued)

*Primary Examiner* — Douglas Godbold
(74) *Attorney, Agent, or Firm* — Graeser Associates International Inc; D'vorah Graeser

(57) ABSTRACT

A system and method for searching through functions and expressions with symbols. Moreover, the system can be used to recognize and further analyze the notations of this nature and use this in order to translate, transform into audio, or solve the mathematical problems. According to at least some embodiments, the functions comprise mathematic equations which are defined by symbols and mathematic notation. The system and method enable a user to enter a mathematical equation in a WYSIWYG environment to a search engine, and to find similar or identical equations, first and foremost according to theoretical similarity, and secondly, according to visual similarity. The engine does this be understanding the meaning behind the visual symbols of the equation using a Dynamic Hidden Markov Model (hereon DHMM). The system enables the user to insert the equation with no prior knowledge of LaTeX, or any computing language, and with no need to follow a predefined generic protocol in order to insert the query.

19 Claims, 17 Drawing Sheets

(51) Int. Cl.
*G06F 17/30* (2006.01)
*G06F 17/10* (2006.01)
*G06F 17/22* (2006.01)

(52) U.S. Cl.
CPC ... *G06F 17/30634* (2013.01); *G06F 17/30831* (2013.01); *G06F 17/30864* (2013.01)

(56) References Cited

U.S. PATENT DOCUMENTS

| | | | | |
|---|---|---|---|---|
| 2006/0005115 | A1* | 1/2006 | Ritter et al. | 715/503 |
| 2007/0266315 | A1* | 11/2007 | Bernardin et al. | 715/538 |
| 2008/0091409 | A1* | 4/2008 | Anderson | 704/9 |
| 2008/0262832 | A1* | 10/2008 | Kano | 704/10 |
| 2008/0262833 | A1* | 10/2008 | Kano et al. | 704/10 |
| 2012/0042242 | A1* | 2/2012 | Garland et al. | 715/256 |

OTHER PUBLICATIONS

Chou P A: "Recognition of Equations Using a Twodimensional Stochastic Context-Free Grammar", Visual Communications and Image Processing IV, Nov. 8-10, 1989, Philadelphia, Bellingham, WA, US, val. 1199, Nov. 8, 1989, pp. 852-863, XP000431448.

Misutka J Et Al: "Mathematical Extension of Full Text Search Engine Indexer", Information and Communication Technologies: From Theory to Applications, 2008. ICTTA 2008. 3rd International Conference On, IEEE, Piscataway, NJ, USA, Apr. 7, 2008, pp. 1-6, XP031258148, ISBN: 978-1-4244-1751-3.

Zanibbi R Et Al: "Recognizing Mathematical Expressions Using Tree Transformation", Transactions on Pattern Analysis and Machine Intelligence, IEEE, Piscataway, USA, vol. 11, No. 24, Nov. 2002, pp. 1455-1467, XP001141352, ISSN: 0162-8828, DOI: 10.1109/TPAMI.2002.1046157.

Jakjoud W: "Representation, handling and recognition of mathematical objects: State of the art", Research Challenges in Information Science, 2009. RCIS 2009. Third International Conference on, IEEE, Piscataway, NJ, USA, Apr. 22, 2009, pp. 427-438, XP031477178, ISBN: 978-1-4244-2864-9.

Abuein Q Q Et Al: "Expanded grammar for detecting equivalence in math expressions", Digital Ecosystems and Technologies, 2009. DEST '09. 3rd IEEE International Conference On, IEEE, Piscataway, NJ, USA, Jun. 2009, pp. 575-580, XP031539631, ISBN: 978-1-4244-2345-3.

IPRP of May 8, 2013 for related PCT/IB2011/054892.

ISR of Mar. 5, 2013 for related PCT/IB2011/054892.

Jurafsky, Daniel, et al: "Speech and Language Processing. An Introduction to Natural Language Processing, Computational Linguistics, and Speech Recognition", Second Edition, (2009; Prentice-Hall), 7.2: Overview of Hidden Markov Models.

* cited by examiner

SYSTEM AND METHOD FOR SEARCHING FUNCTIONS HAVING SYMBOLS

FIELD OF THE INVENTION

The present invention relates to a system and a method for searching functions having symbols, and in particular, to such a system and method which enable the search to be performed for scientific and mathematical functions and expressions which feature symbols.

BACKGROUND OF THE INVENTION

The Internet has enabled computer users all over the world to interact and communicate electronically. One particularly popular mode for communication features Web pages, which collectively form the World Wide Web. Web pages are useful for displaying text and graphics, and even animation, video data and audio data. However, the explosion of information has made it more difficult for users to find the information of interest.

Various generic search engines are available which attempt to provide such information to users. For example, Google®, Yahoo®, Ask®, Bing® (Microsoft) are all examples of search engines which can be used by any user to search any topic. However, their generic nature also renders them non-specific; for example, certain types of specialized searches simply cannot be performed through these search engines (AKA the deep web).

SUMMARY OF THE INVENTION

The background art does not teach or suggest a system and a method for efficiently searching through expressions, and in particular having symbols. The background art also does not teach or suggest a system and a method for searching mathematical equations.

The present invention overcomes these drawbacks of the background art by providing a system and method for entering and analyzing functions having symbols, which according to at least some embodiments features a "WYSIWYG" (What You See Is What You Get) user interface, which may optionally and preferably be used for intuitive entry of mathematical functions by the user. According to at least some embodiments, the functions comprise mathematic equations which are defined by symbols and mathematical notation.

The system and method of the present invention, in at least some embodiments, enable a user to enter a mathematical equation to a search engine, and to find similar or identical equations. By "similar" it is meant optionally equations that are mathematically, or scientifically, interpretable to be the same and/or optionally also (additionally or alternatively) formulas sharing important scientific or mathematical features, or meanings, even if not visually similar. The user may also optionally be able to specify one or more additional words, and/or categories, to assist with the search.

For example, a user who wishes to determine whether a particular equation, or semantically similar equation, has been used in a scientific article is currently unable to search for such equations. Currently available search engines are only able to process words. However, mathematic equations, with their particular notation and symbols, have their own meaning and cannot be interpreted as ordinary text. The present invention overcomes these drawbacks of the background art by enabling the user to search for an equation, even if different symbols are used, according to the mathematical "meaning" (i.e. interpretation) of the equation. If an equation does store character data, the current engines can only search this data visually, and even then, are unable to cope with even the slightest changes between the query and the pages on the web. In addition, current engines can extract only fragments of the data contained in the expressions. More elaborately, for most advanced PDF files (versions 9 or 10), the searchable symbols are only those consisting of Alphabet characters, and even then, information such as subscript or superscript is usually lost. For example, if a certain equation would contain the expression $a^b$, the data extracted would state ab or a_b. Furthermore, the present invention in at least some embodiments enables the search engine to cope with any kind of data, either structured or unstructured.

Without wishing to be limited in any manner, the present invention in at least some embodiments overcomes a number of important obstacles in order to conduct an efficient scientific search, including overcoming the difficulty even to input such a query, whether featuring a scientific or mathematical expression alone or in combination with text, by providing an easy to use input interface; and also overcoming the difficulty for current search engines to understand the semantic meaning of scientific and mathematical equations.

According to at least some embodiments, complex mathematical functions may be searched. As a non-limiting example, a mathematical function may optionally and preferably comprise a plurality of operational symbols, which include any type of mathematical symbol indicating that an operation of some type is to be performed. Equations with a plurality of such operational symbols are particularly difficult to search, since they are difficult to analyze. Therefore, the method according to these embodiments of the present invention preferably comprises determining a mathematical semantic relationship between a plurality of components in a mathematical equation, wherein each mathematical component comprises at least one operator and optionally at least one variable. The "variable" in this case may optionally be another part of the equation, for example, upon which the operation is to be performed. Clearly, similar methods may optionally be applied to other types of scientific expressions, such as scientific formulas for example.

According to at least some embodiments, the mathematical function may be searched even if different but mathematically equivalent symbols are used within the equation. For example, symbols representing variables in an equation such as "a" and "b" may be considered to be mathematically equivalent, although they are different symbols. The function is preferably converted to a standardized internal format for searching, thereby overcoming such apparent differences which in fact do not impact upon the mathematical interpretation of the function.

According to at least some embodiments, the mathematical function may be searched even if the same visual symbols have different meanings (an independent variable as opposed to a dependent variable). Thus, equations having visual similarities, but lacking similar theoretical resemblance, would not match each other.

According to at least some embodiments, words are used in order to increase the probability of the elements of the expressions being labeled (identified) with a correct meaning. For example, if "relativity" is present in the headline, there is one more reason to think that E in $E=mc^2$ stands for energy, scientifically, and thus can be interpreted as being a dependent variable, mathematically.

According to at least some embodiments, the mathematical function may be searched even if the order of the symbols is different, but the operators distinguishing the equations are commutative. For example, if the symbols have different meanings ($y'(x)+x^2$ and $x^2+y'(x)$), or if the meaning of the symbols is identical ($x+y$ and $y+x$).

According to at least some embodiments, semantic features are extracted from the query and given a weight depending on their semantic role. Thus, according to at least some embodiments, the scientific/mathematical functions can be searched and presented, in some cases, in the results even if there is a semantic difference between them. For example, if $\int a \cdot x^2 dx$ is searched, $\int x^2 dx$ can be given in the results as the only difference is a wildcard constant coefficient. On the other hand, $a^x$ and $x^a$ will not be matched since the role of a variable power is crucial. Thus, relevance depends on the specific semantic context of the scientific symbols.

By "function" it is meant any expression featuring a plurality of symbols, in which at least one symbol is not alphanumeric or a type of punctuation. By "punctuation" it is meant any symbol used in normal writing activities, such as a comma, period, question mark, exclamation point, colon, semi-colon, single or double glyphs (quotation marks) and the like. It should be noted that with regard to the specific punctuation exceptions listed above, a punctuation symbol may be present in the expression but is not considered to fulfill the requirement of at least one symbol not being a type of punctuation. However, optionally the symbol may feature a mark typically used in mathematics, including but not limited to a bracket or parenthesis, a minus symbol (or hyphen), a slash or solidus, an interpunct and the like, which would fulfill the requirement of at least one symbol not being a type of punctuation. Optionally, the punctuation may be implied, as for example the term "xy" when used in a mathematical function, referring to "x times y": the punctuation or operator "times" is implied.

According to at least some embodiments, the functions comprise scientific expressions which are defined by symbols and mathematical notation. For example, a scientific expression may optionally and preferably comprise a plurality of operational symbols, which include any type of mathematical symbol indicating that an operation of some type is to be performed. Optionally, the equation features a plurality of components, wherein each mathematical component comprises at least one operator and optionally at least one variable. The "variable" in this case may optionally be another part of the equation, for example, upon which the operation is to be performed.

By "function in a visual format" it is meant a function, such as a mathematical equation, that is provided in a currently acceptable form for any type of print or mark-up language document for display to a human subject, with the proviso that this format does not include specialized formats used by software such as LaTeX and the like.

The search may optionally be performed on-line.

By "online", it is meant that communication is performed through an electronic communication medium, including but not limited to, telephone voice communication through the PSTN (public switched telephone network), cellular telephones, IP network, or a combination thereof; data communication through cellular telephones or other wireless devices; any type of mobile or static wireless communication; exchanging information through Web pages according to HTTP (HyperText Transfer Protocol) or any other protocol for communication with and through mark-up language documents or any other communication protocol, including but not limited to IP, TCP/IP and the like; exchanging messages through e-mail (electronic mail), messaging services such as ICQ_ for example, and any other type of messaging service or message exchange service; any type of communication using a computer as defined below; as well as any other type of communication which incorporates an electronic medium for transmission.

Unless otherwise defined, all technical and scientific terms used herein have the same meaning as commonly understood by one of ordinary skill in the art to which this invention belongs. The materials, methods, and examples provided herein are illustrative only and not intended to be limiting. Implementation of the method and system of the present invention involves performing or completing certain selected tasks or stages manually, automatically, or a combination thereof. Moreover, according to actual instrumentation and equipment of preferred embodiments of the method and system of the present invention, several selected stages could be implemented by hardware or by software on any operating system of any firmware or a combination thereof. For example, as hardware, selected stages of the invention could be implemented as a chip or a circuit. As software, selected stages of the invention could be implemented as a plurality of software instructions being executed by a computer using any suitable operating system. In any case, selected stages of the method and system of the invention could be described as being performed by a data processor, such as a computing platform for executing a plurality of instructions.

Although the present invention is described with regard to a "computer" on a "computer network", it should be noted that optionally any device featuring a data processor and memory storage, and/or the ability to execute one or more instructions may be described as a computer, including but not limited to a PC (personal computer), a server, a minicomputer, a cellular telephone, a wireless communication device, a smart phone, a PDA (personal data assistant), a pager, TV decoder, VOD (video on demand) recorder, game console, digital music or other digital media player, e-books, ASR (Automatic Speech Recognition) machines, Speech Synthesis machines, ATM (machine for dispensing cash), POS credit card terminal (point of sale), or electronic cash register. Any two or more of such devices in communication with each other, and/or any computer in communication with any other computer may optionally comprise a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
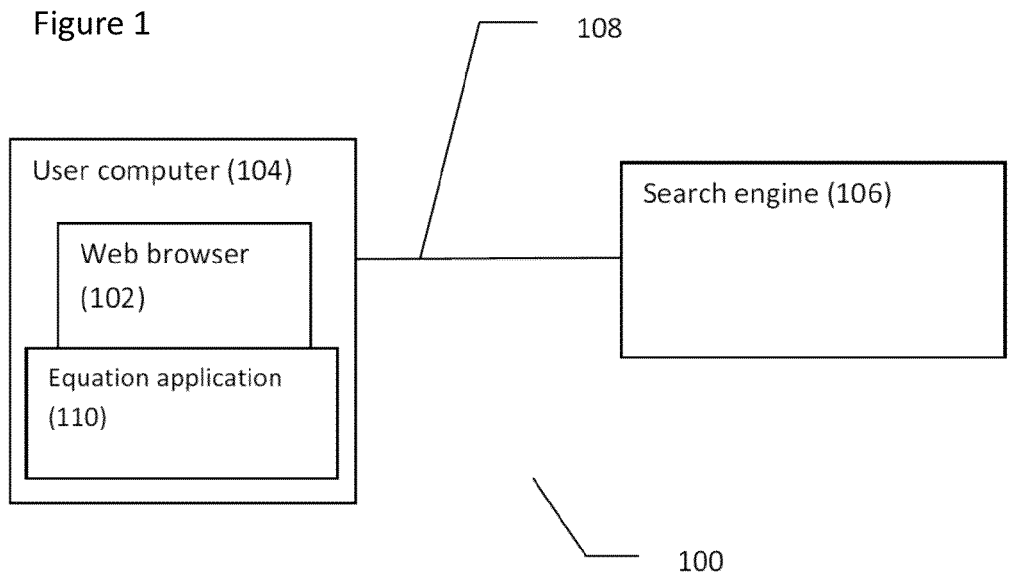
FIG. 1 is a schematic block diagram of an exemplary system according to the present invention.

The present invention is of a system and method for searching through functions having symbols. According to at least some embodiments, the functions comprise mathematical equations which are defined by symbols and mathematical notation. The system and method enable a user to enter a mathematical equation to a search engine, and to find similar or identical equations.

The first stage of the engine's indexing is preferably the decoding of the notations into some type of machine suitable format, non-limiting examples of which include LaTeX, or LaTeX-like writing via HTML, XML or other image or document processing procedures available today. The description provided herein explains the process from the point the visual-text decoding was completed.

The present invention, in at least some embodiments, relies upon an inventive mathematical model for dynamic interpretation of expressions, such as mathematical equations, of which an illustrative, non-limiting example is described below (termed DHMM (or Dynamic Hidden Markov Model)).

| Term | Definition |
|---|---|
| Scientific Symbol | Any distinctive scientific symbol that represents a scientific concept. Scientific symbols can be constructed of a single character (such as 'x') or from a set of characters (such as 'sin'). |
| Scientific Equation or Formula | A set of scientific symbols that together provides a meaning to the specific scientific field. |
| Structured scientific equation | A scientific equation (formula) that is expressed in a publicly known structured format such as: LaTex, MathML, Maple, Mathematica and more. For example a LaTex structured equation "\sqrt{x + y}". |
| Unstructured scientific equation | A scientific equation (formula) that is an expression with regular text characters and not by a publicly structured format. For example: "sin$^2$(x + y) or "(sin(x + y))^2" |
| Document | A document contains multiple types of information including, but not limited to: text, images, structured scientific equations, unstructured scientific equations and more. |
| Tag | One or more words that represent a meaningful scientific concept. |
| Symbol labeling | Also referred to as tagging: The process of semantically understanding the purpose of the scientific symbol and labeling it accordingly. For example: "sin$^2$(x + y)" will label: sin as trigonometric function 2 as a known integer power x, y as independent variables + plus operator ( ) as algebraic parentheses |
| Equation classification | The process of semantically understanding the equation and classifying it into a set of tokens, where each token represents a characteristics of the equation. Examples of characteristics: number of variables highest power of variables number of integrals and many more |
| "Learned Transition" (LT) | When a cell $a_{n_j m_{j_i}}$ has a high enough value, it is considered learned. This doesn't mean that the value isn't going to change in the future; it nearly means that there is no need to boost it upwards, relatively to other $a_{n_j m_{j_h}}$ h ≠ i any more. In this article, the value of a LT is the lower of the two: when it has a value that is 3 times higher than the average of picked $\bar{a}_{n_j m_{j_i}}^{picked} + 3 \cdot \sigma_{\bar{a}_{n_j m_{j_i}}}^{picked}$ A Predefined number, in this article, 0.8 is picked |

The principles and operation of the present invention may be better understood with reference to the drawings and the accompanying description.

Referring now to the drawings, FIG. 1 is a schematic block diagram of an exemplary, illustrative system according to the present invention. As shown, a system 100 preferably features a web browser 102 which provides an interface for a plurality of different types of searches through a computer network such as the Internet, intranet and/or any type of LAN (local area network), WAN (wide area network) and the like (not shown). Web browser 102 may optionally be implemented as any type of software user interface, including but not limited to a GUI (graphical user interface), text based interface, audio based interface and so forth. Web browser 102 preferably enables any type of mark-up language document to be displayed, such as web pages for example and more preferably also supports other types of documents, such as word processing document formats, document formats such as the pdf format of Adobe Inc (as an example of a document sharing format), any document with LaTeX-like data, images of equations and the like, for example. Web browser 102 is preferably operated by a user computer 104.

Web browser 102 preferably communicates with a mathematical function search engine/smart symbol search engine 106 (i.e. SSE), for performing the searches, through a computer network 108 such as the Internet for example. The SSE 106 is preferably able to receive the search request from Web browser 102 and to search through a plurality of documents and other information for the results. Optionally, rather than performing the search directly, the SSE 106 communicates with another search engine, or is part of such a general search engine, for performing a search, and more preferably is able to cause the results to be displayed to the user (not shown). SSE 106 is also able to interpret mathematical functions according to a mathematical model, for example and without limitation according to the DHMM (Dynamic Hidden Markov Model) described in greater detail below. Of course, other such mathematical models could be used in place of, or in addition to, such a mathematical model, such that the present invention is not limited to implementation with the DHMM or any other specific mathematical model.

The user preferably enters a mathematical function, or symbols, such as an equation or expression, into Web browser 102. Optionally and preferably, Web browser 102 is in communication with an equation application 110, which provides a WYSIWYG (What You See Is What You Get) environment (such as the one provided by Mathtype Equation or similar to that shown in FIG. 9), in which the searcher could input the exact expression of interest. More preferably, the mathematical function could be an equation including various symbols and also various types of notation. Optionally and most preferably, although any type of mathematical language may optionally be used (such as LaTeX for example), the user is not required to learn a new symbolic language but instead can input the equation with any type of mathematical symbols and notation. As a non-limiting example, the equation could contain $$\int_0^\infty e^{ix}\cos(nxy)dx, \nabla^2, \begin{pmatrix} a_{11} & \cdots & a_{1n} \\ & & \\ a_{n1} & \cdots & a_{nn} \end{pmatrix}, p_x,$$

$$(x^2+y^2)\Delta u - k^2 u = 0.$$

Equation application 110 could optionally be implemented as a plug-in to Web browser 102, or alternatively could be a stand-alone application.

The user may also optionally be able to add one or more words to the search, for example by entering the one or more words through Web browser 102. Optionally, alternatively or additionally, the user may be able to specify a particular web location, such as a particular domain name or URL, again for example through Web browser 102.

Figure 2:
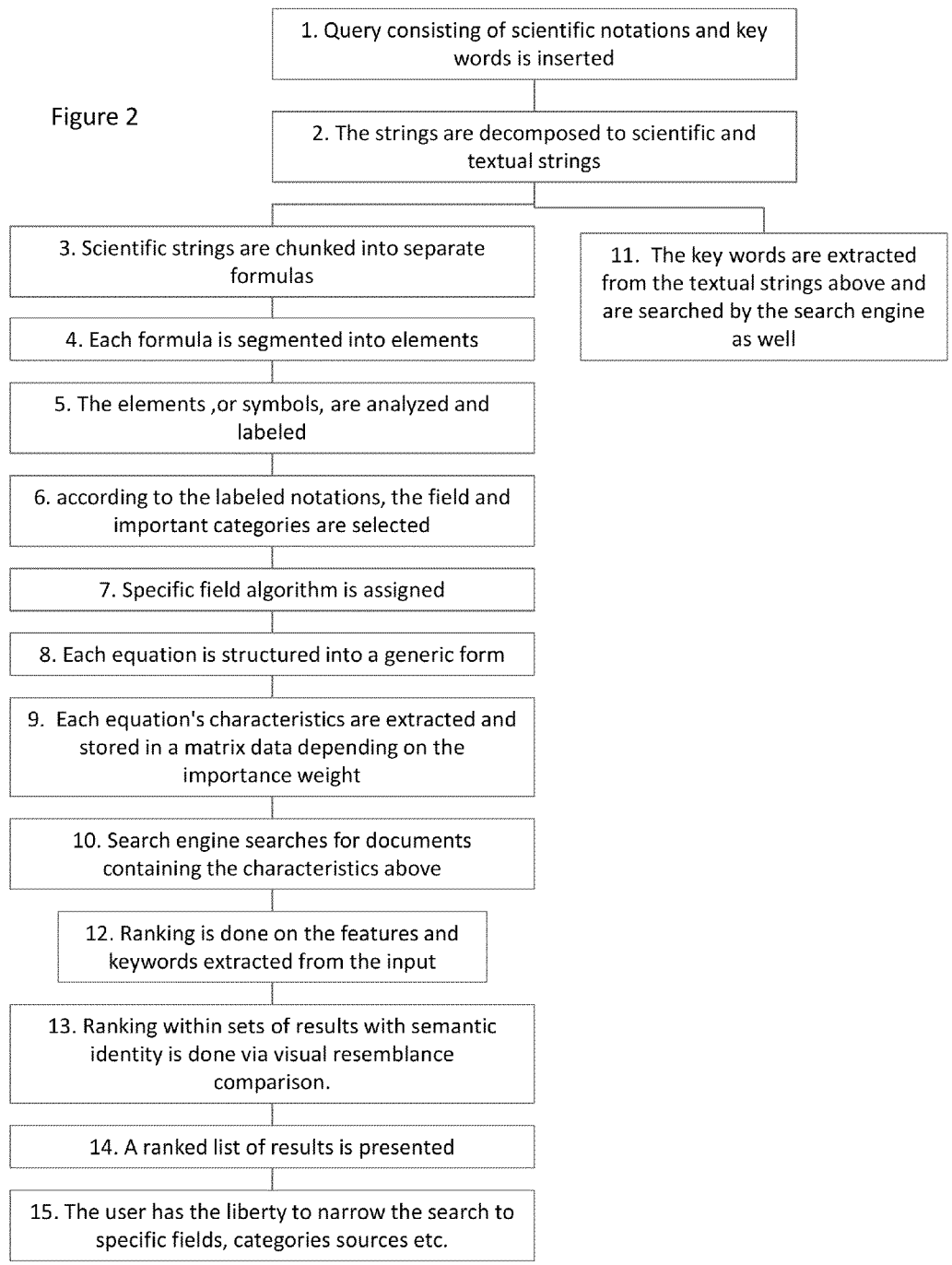
FIG. 2 shows an exemplary method according to at least some embodiments of the present invention for performing a search with the system of FIG. 1.

FIG. 2 shows an exemplary method according to at least some embodiments of the present invention for performing a search, for example optionally with the system of FIG. 1. Each stage is indicated below with regard to the numbered sections.

1. As previously described, the user could optionally and preferably enter an equation to query through the equation application, as shown for example with regard to FIG. 9. The non-limiting examples of formulas given $$\text{above were: } \int_0^\infty e^{ix}\cos(nxy)dx, \nabla^2, \begin{pmatrix} a_{11} & \cdots & a_{1n} \\ & & \\ a_{n1} & \cdots & a_{nn} \end{pmatrix}, p_x,$$

$$(x^2+y^2)\Delta u - k^2 u = 0$$

2. The input is preferably decomposed into a plurality of elements, featuring scientific and textual strings that comprise notations or keywords.
3. The strings for the input are then grouped into scientific equations based on their position in the query.
4. The notations for each equation are preferably separated according to a number of different criteria (a process also called segmentation), various examples of which are given below, in order to determine the number of symbols. Optionally and preferably the criteria include (but are not limited) separation according to one or more pre-determined constraints; position of the symbols; and identification of the symbol boundaries.

Once the starting and ending point of each symbol has been established, it is possible to determine the number of different symbols that are present in the equation. This number is the number of state observations for the mathematical model (for the purpose of discussion only, this mathematical model is assumed to be state-dependent; of course, a non state-dependent model could also optionally $Q=q_1q_2 \ldots q_N$ a set of N states $O=o_1o_2 \ldots o_T$ A sequence of state observations (the order is not yet determined).

T The number of different symbols in the equation.

When a symbol repeats itself, then the number of repetitions that their position is of importance is assigned as $o_{t_{R_t}}$, where $R_t$ the number of that symbol with position importance for observation t.

For performing the search, preferably consistency in labeling is maintained within each document. In each document, the expressions/equations are analyzed according to the order they appear. The tagging or symbol labeling for already labeled symbols is maintained accordingly for subsequent expressions/equations within that particular document.

Each symbol may optionally have several different meanings. For example, y can be a dependent, or an independent variable, or may have some other meaning. The symbol i can be either the imaginary number or an integer index. The next part of the algorithm relates to the analysis of the symbol's meaning in a particular equation.

5. In this stage, stage 5, the meaning of each symbol in one equation is preferably analyzed as follows. The observation's likelihood is optionally given as: $b_i(o_{t_{r_t}})$ for $i=1, \ldots, N$ for $t=1, \ldots, T$ for $r_t=1, \ldots, R_t$, which means the probability of observation $o_{t_{r_t}}$ to be in state i. Only possibilities of $b_i(o_{t_{r_t}})$ surpassing a certain threshold are preferably considered.

As a non-limiting example, i can be an imaginary number or an integer index, but the likelihood of this symbol indicating a sum sign ($\Sigma$) is very low. Elimination of low probability meanings is preferably performed so that only plausible possibilities are considered during this process. The state of each symbol is dependent both on the sign representing that symbol ($o_t$) which for example may optionally comprise one or more characters, and, usually, on other states present in the equation. A mathematical model, non-limiting examples of which include the DHMM (Dynamic Hidden Markov Model) or HMM (Hidden Markov Model), both of which are described in greater detail below, is preferably used in order to determine the meaning of each symbol (if it was not already deciphered earlier). Preferably, the mathematical model that is employed comprises a probabilistic model, for probabilistically determining the correct label for each symbol.

Providing a label for each symbol, or "labeling", may also optionally be described as determining a "meaning" for each symbol. Furthermore, as described in greater detail below, as each symbol is assigned a "meaning" through its assigned label, semantic connections between the symbols may also be determined according to the symbol labels.

6. Once all the symbols are labeled or tagged, optionally and preferably the most appropriate subject matter or content field is selected. Optionally, the subject matter or content field, herein collectively referred to as the "field", is determined according to the combination of symbols and their tagging, and/or according to an external information and/or according to one or more user commands or inputs. Optionally, a pre-made list of subjects, each containing categories of sub-field, may be used. For each sub-field preferably a repository of all of the commonly used notations is provided, whether manually or automatically, and the possibilities of certain combinations to belong to that sub-field are also preferably provided. The most probable field/s is/are adopted.

7. Once the field/s is/are determined, the algorithm for the specific field is assigned. Such an assignment may optionally be performed by categorizing the equation within the subfield dependent on the sub-field, as described with regard to FIG. 7 (illustrating the determination of one or more crucial features for a sub-sub-field). Next, the equation within the sub-sub-field is preferably categorized according to important features with varying importance for that sub-sub-field.

8. Next, each equation's structure, which is preferably dependent on its sub-field and more preferably also dependent on its sub-sub-field, is preferably transformed into a generic structure, as described in greater detail below.

9. Each equation's characteristics and features are extracted and stored in a matrix data structure according to appropriate weights.

10. The search engine searches for websites and/or documents, through the Internet or another computer network, which contain the characteristics or features of the equation as described in greater below. Optionally and preferably, the results are first sorted using any typical search engine ranking process, for example to remove any clearly non-relevant material. Furthermore, the search engine may also optionally sort the results using any method typically applied to classify a "regular" word or plurality of words, except that instead of words, equations are used (word—one equation; plurality—if more than one equation is input to the search engine).

11. The search engine searches for websites and/or documents, through the Internet or another computer network, which contain the keywords extracted from input.

12. Next, the search results are preferably ranked as follows; as described in greater detail, optionally only results that achieve a certain ranking are provided to the user. Ranking is preferably first performed according to the crucial features of the sub-field and more preferably also according to the crucial features of the sub-sub-field.

More preferably, such ranking is binary, such that only equations with features that may appear within that sub-field, and more preferably only within that sub-sub-field, are permitted to appear in the results.

Next ranking is preferably performed within results that have the one or more crucial features. Now the important features are preferably weighted by their importance and by the importance of them to be equal to the query ("high penalty"). The weighting is optionally performed according to one or more parameters or metrics. An important feature preferably receives a higher coefficient constant. A less important feature preferably receives a lower coefficient constant. Features that preferably receive a higher penalty for differing (for example, the number of variables) from the query could get an increased penalty by using a higher order metric (square, for instance).

13. Within a set of results that have the same or similar ranking according to the above criteria, ranking is optionally then performed in a process which relates to the visual similarity of the generic form and then, if necessary or desired, optionally to the visual similarity of the non-generic form. Since this application will work within a "regular" search engine, the searcher could add words and thus potentially increase the accuracy of the search.

14. The engine search then preferably provides a list with hyper-links to the sites and documents, starting from the most relevant, preferably also stating the sub-field of the hits. Within the documents, the relevant equations/expressions are preferably marked in order to simplify the user's search within the pages. For an expression, results for identical sub-sub-fields could be ranked if no other hits obtain a higher rank.

15. The user will have the possibility to narrow down the search for specific fields only if more than one is present. Alternatively, a regular visual based search is performed if the above process does not produce the desired results. Optionally, if the results are not satisfactory, the user can manually enter the state of each symbol, the field etc. and thus optionally improve the engine's capabilities in the future.

16. The results of the one or more search(es) are preferably output with hyperlinks, optionally separately or alternatively in a collected manner.

EXAMPLES

1. Example 1—The expression in the input is $(x^3+y^3)\Delta u-k^2 u=0$. For this non-limiting example there are assumed to be 6 documents with notations such as these:
   a. A document containing $(x^3+y^3)-k^2 u=0$.
   b. A document containing $(x\^{}3+y\^{}3)*Delta(u)-(k\^{}2)*u=0$.
   c. A document containing $(x^3+y^3)\Delta u-k^2 x=0$.
   d. A document containing $$(x^3 + y^3 + w^3 + z^3)\frac{\partial^2 v}{\partial x^2} + (x^3 + y^3 + w^3 + z^3)\frac{\partial^2 v}{\partial y^2} + (x^3 + y^3 + w^3 + z^3)\frac{\partial^2 v}{\partial w^2} + (x^3 + y^3 + w^3 + z^3)\frac{\partial^2 v}{\partial z^2} - \left(\frac{a \cdot b}{c}\right)^2 \cdot v = 0.$$

e. A document containing $(u^3+v^3)-\nabla-k^2 v=0$.
   f. A document containing $(n^3+m^3)\Delta u-k^2 u=0$.

If the expressions were input, a typical prior art search engine would probably rank the documents containing $(x^3+y^3)-k^2 u=0$ and $(x^3+y^3)\Delta u-k^2 x=0$ as the best matches due to their visual resemblance. However, such a result is clearly not correct, as the visual resemblance is clearly not related to the intrinsic meaning of these equations.

By contrast, the search engine according to at least some embodiments of the present invention would provide completely different and more correct ranking results.

Clearly the following three symbols may be easily classified (x, Δ, u) since it is highly likely that x—independent variable; Δ—Laplacian; u (after Δ)—dependent variable. Moreover, these symbols hold information regarding the other symbols. The next symbol to be determined is $^3$—power of three since it is above an independent variable. Next, y—independent variable since (x,u) are present, and x and u are tagged as dependent and independent respectively. Then the following symbols are determined: k—constant; and the symbol $^2$ which is the power of 2.

Now that the symbols are tagged, the search engine according to at least some embodiments of the present invention can tag the whole equation as a Linear Homogeneous PDE (partial differential equation) with two independent variables, acting as coefficients to one dependent variable operated by a Laplacian, as described below with regard to FIG. 7. Finally, the same dependent variable with a constant coefficient is tagged. Now the equation is transformed into a generic form.

The search engine would then rank the six documents in the following order (with the first rank being the best match):
I. The document containing (x^3+y^3)*Delta(u)−(k^2)*u=0. This expression is identical to the original one in different language (used mainly for programming documents).
II. The document containing $$(x^3 + y^3 + w^3 + z^3)\frac{\partial^2 v}{\partial x^2} + (x^3 + y^3 + w^3 + z^3)\frac{\partial^2 v}{\partial y^2} +$$
$$(x^3 + y^3 + w^3 + z^3)\frac{\partial^2 v}{\partial w^2} + (x^3 + y^3 + w^3 + z^3)\frac{\partial^2 v}{\partial z^2} - \left(\frac{a \cdot b}{c}\right)^2 \cdot v = 0.$$

This is the same equation but with two more independent variables (which is extremely similar according to the meaning of the equations).
III. The document containing $(n^3+m^3)\Delta u - k^2 u = 0$ which is very close visually, but this time can be solved using Fourier synthesis.
IV. The document containing $(x^3+y^3)\Delta u - k^2 x = 0$ which is very different because x—an independent variable substituted u—a dependent variable.
V. The document containing $(u^3+v^3)\cdot\nabla v - k^2 v = 0$ which is a non-linear PDE.

The document containing $(x^3+y^3)-k^2 u = 0$ would optionally and preferably not be presented at all since it is not a differential equation of any kind.

2. Example 2—The expression in the input is $p_x$ and I. For this non-limiting example there are assumed to be 4 documents with notations such as these:
a. A document containing $$I = \sum_{i=1}^{n} i \cdot p_i.$$

b. A document containing $p_x$. In the same document there exists the notation $\langle p_x, p_y \rangle$
c. A document containing $p_y$.
d. A document containing $$\frac{\partial p}{\partial I}.$$

Search Results:
It is determined that the search relates to the sub-field of micro-economics according to the characteristics of the equation. Based upon this information, the below ranking is provided by the search engine (according to the previously described order):
I. The document containing $$I = \sum_{i=1}^{n} i \cdot p_i.$$

The engine identifies the closeness of I with a notation of the form $p_k$. Crossing the information yields results from the sub-subject of micro economics with notations that are identical theoretically to the ones in the input.
II. The document containing $p_y$. While there is no I, it is possible that this document also relates to prices and hence fits the sub-field.
The document containing $$\frac{\partial p}{\partial I}$$

is optionally not presented, as this expression has a completely different theoretical interpretation. As a result of the nearness of $p_x$ and $\langle p_x, p_y \rangle$ these symbols are recognized to have completely a different interpretation as well.

3. Example 3—the expression in the input is $\int f(z)dz$. For this non-limiting example there are assumed to be 4 documents containing such notations:
a. A document containing $2\pi i$ $$\sum_{k=1}^{n} res(z_k).$$

b. A document containing $\int e^z dz$.
c. A document containing $$\bigcup_{\alpha} x_\alpha.$$

d. A document containing $f(z) = z^2 + 500 \cdot a$.
The below ranking is provided by the search engine:
I. The document containing $$2\pi i \sum_{k=1}^{n} res(z_k).$$

The trajectory integral and the categories of the symbols result in categorizing this expression as a complex mathematical equation.

$$2\pi i \sum_{k=1}^{n} res(z_k)$$

is also a complex mathematical equation. Therefore the ranking would not relate to non-complex mathematical equations.

II. The document containing $\int e^z dz$. There is visual similarity but low theoretical similarity, as it is still an integral with one variable that could appear in complex theory but there is no implicit residue.

III. The document containing $f(z)=z^2+500 \cdot a$, the symbols used make it possible that this document concerns the same sub-subject (complex math).

The expression $$\bigcup_\alpha X_\alpha$$

has little to do with calculus or complex math, thus preferably does not appear in the search results. After the tagging stage, the analysis indicates that X is a group indicator, and therefore that this expression belongs to group theory and not to calculus.

Figure 3:
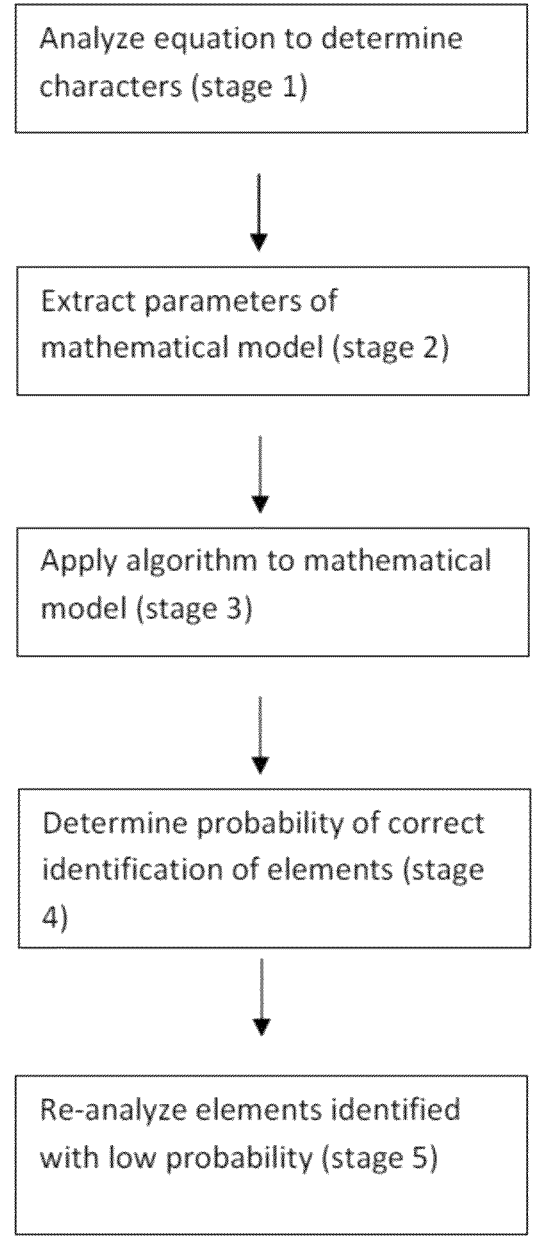
FIG. 3 shows an exemplary, illustrative method according to at least some embodiments of the present invention for segmentation of an expression.

FIG. 3 shows an exemplary, illustrative method according to at least some embodiments of the present invention for segmentation of an expression. The method is described with regard to a non-limiting example of a specific equation to be analyzed or segmented according to the above method: sin {2x}. This equation has four states: Beginning of element ("s"); End of element "n"; Middle of element "i"; Beginning and end of an element "{", "2", "x", "}". The segmentation method below describes the determination of each element and also of each state.

In stage 1, the equation is analyzed to determine each character. Every character is an observation.

In stage 2, each character needs to be identified through a process described herein as "tagging". The parameters of the mathematical model are extracted according to the tagging process, as described in greater detail below. Briefly, each character or combination of characters is considered with regard to the probability of having a particular identification. It should be noted that there may optionally be interdependence on the identification of a plurality of characters, which may also optionally be included in the mathematical model.

In stage 3, an algorithm is applied to the model in order to determine the most likely combination of identified characters as the elements. In the non-limiting examples below, the forward algorithm is applied to the mathematical model of the HMM or DHMM.

Once the forward algorithm has been applied to the tagged elements, such that the elements have been defined probabilistically, the probability that the elements were correctly identified is analyzed in stage 4.

Elements that have been identified with a low probability are preferably analyzed as follows in stage 5. The probability of each potential segmentation (correct identification of the elements of the equation) is calculated depending on the two rarest or least frequently analyzed symbols that are present. The frequency with which a symbol is analyzed may optionally be determined with regard to the repository as described in greater detail below. Furthermore, the determination of "rare" is preferably made with regard to a threshold, such that (for example) symbols may be classified according to their frequency of analysis by thresholds. The most likely segmentation is picked. When there are no other least frequently analyzed symbols then more common ones are picked, and again the probability is checked. If no other symbols in the expression are present with the disputed element, then the original segmentation is picked, because there is no way to improve the original results.

Figure 4A:
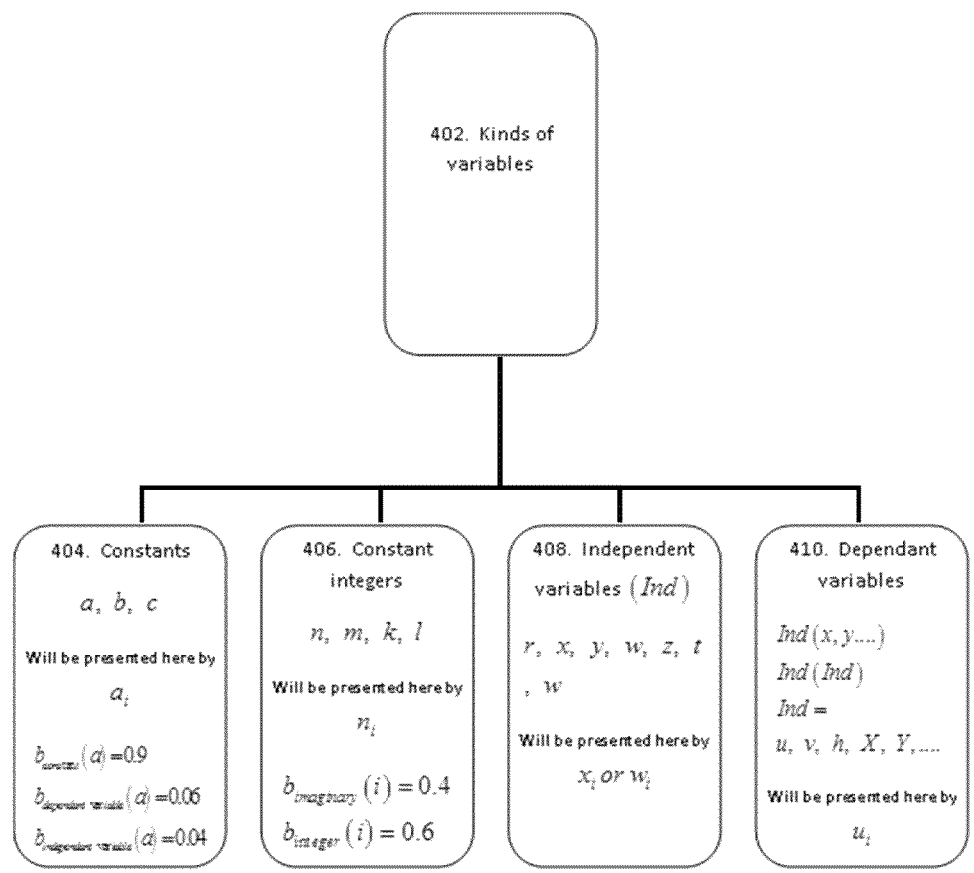
FIG. 4A shows an exemplary repository according to at least some embodiments of the present invention.

FIG. 4A shows an exemplary repository according to at least some embodiments of the present invention. As shown, a repository 400 for all notations preferably features, for example, at least a collection of types of variables 402. Types of variables 402 are then preferably subdivided into constants 404, which are preferably represented by the standard notation "a" (if more than one variable of this type is present, then each could be "a1", "a2" and so forth); constant integers 406, which are preferably represented by the standard notation "n" (if there is more than one, then a similar conversion could be made as above); independent variables 408, which are preferably represented by the standard notations "x" and "w" (again optionally with multiple independent variables of each type); and dependent variables 410, which are preferably represented by the standard notation "u" (again optionally with multiple dependent variables).

Figure 4B:
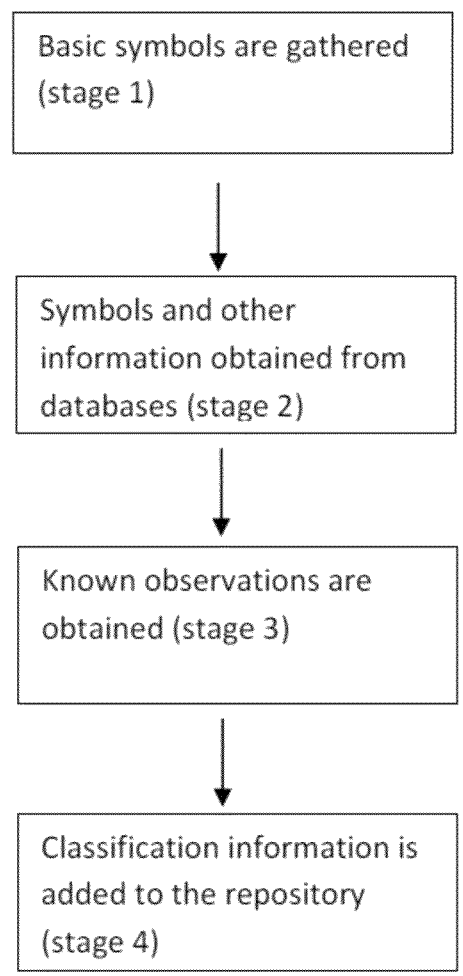
FIG. 4B shows an exemplary, non-limiting method for constructing a repository according to FIG. 4A according to at least some embodiments of the present invention.

FIG. 4B shows an exemplary, non-limiting method for constructing a repository according to FIG. 4A according to at least some embodiments of the present invention. As shown, in stage 1, basic symbols are gathered from a variety of sources, optionally and preferably including all numbers and all basic mathematical symbols. In stage 2, optionally symbols and more detailed information are gathered from a variety of external databases, including but not limited to LaTeX, Maple and other known software programs, and also optionally known databases such as Wikipedia and so forth. These symbols preferably also include symbol labels.

In stage 3, optionally and preferably known observations (which are symbols that are known to be joined together or somehow related) are included in the repository, again optionally from the above and/or other sources, such as scientific journals for example. Such information may optionally also be used to determine symbol labels and is preferably used to determine a plurality of semantic connections between said symbols according to a likelihood of an occurrence of such semantic connections.

Figure 5A:
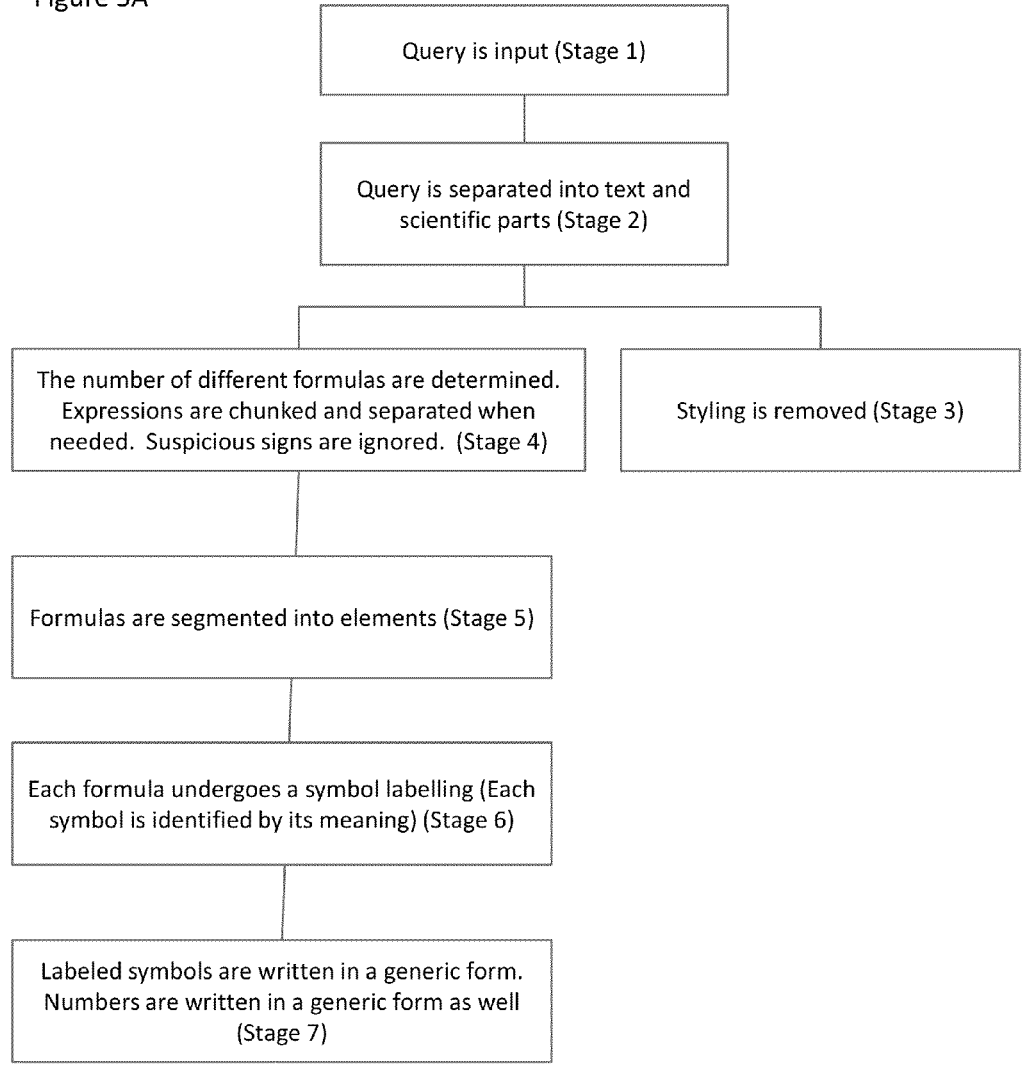
FIGS. 5A and 5B relate to an optional, exemplary, illustrative input method for entering an expression by a user according to at least some embodiments of the present invention.
Figure 5B:
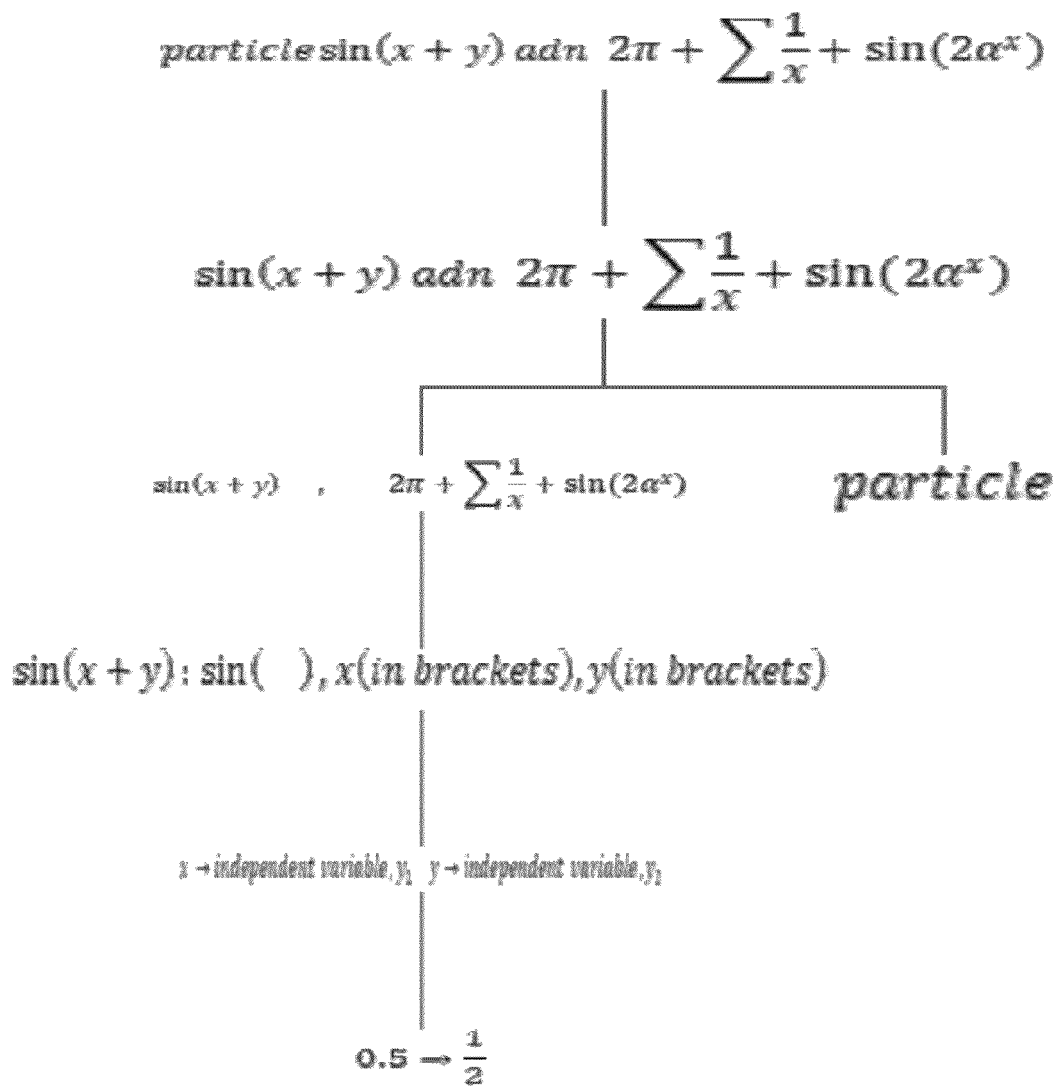

In stage 4, optionally classification information is added to the repository, for example relating to different scientific fields and so forth. FIGS. 5A and 5B relate to an optional, exemplary, illustrative input method for entering an expression by a user according to at least some embodiments of the present invention. As shown, in stage 1, a query comprising an expression, such as an equation for example, is input by a user. Optionally a GUI (graphical user interface) may be used, for example as described with regard to FIG. 9.

In stage 2, the equation is optionally and preferably separated from other material, such as text, in the query. An exemplary method for performing such a separation is described with regard to FIG. 8.

In stage 3, styling and visual indications that are unimportant for the equation are preferably removed. While styling is important for visual presentation of the scientific expression, it is not required to understand the concept of the expression. Non-limiting examples of styling that are removed include Font type, style and color; Spacing indicators; Document indentations and other document related information (for example, where the above described equation is input within a document and/or is input by using a document editor); and so forth.

In stage 4, the number of different equations present in the query is preferably determined. The equations are then separated and optionally one or more unclear symbols are ignored.

In stage 5, the equations are segmented into elements, optionally as described with regard to the method of FIG. 3. For example, for the equation $$"2\pi + \sum \frac{1}{x} + \sin(2\alpha^x)",$$

the list comprises: NumberElement (2), CharacterElement (π), OperatorElement(+), BigOperatorElement(Σ), FractionElement $$\left(\frac{1}{x}\right),$$

FunctionElement(sin), ParenthesesElement, ScriptsElement ($\alpha^x$) and more.

In stage 6, the elements are identified. Optionally and preferably such identification is performed by analyzing these elements and dividing them into two groups: a group of elements that require tagging, as their meaning is potentially unclear; and a group of elements that do not require tagging, as their meaning is clear.

Non-limiting examples of elements that require tagging, and hence which fall into the first group, include: CharElement—characters for which their purpose in the expression is not clear; and ParenthesesElement—parentheses in scientific expressions have several purposes (algebraic, dependence, differential . . . ). Since the purpose of such parentheses is not always clear, these elements preferably undergo a particular type of tagging.

Non-limiting examples of elements that don't require tagging include such basic components as NumberElement and OperatorElement (the latter preferably referring to such basic operators as plus ("+") and the like.

Somewhat more complex components that may also not require tagging include but are not limited to BigOperatorElement, FractionElement, FunctionElement, ScriptsElement. The meaning of these elements is typically clear and so they do not themselves require tagging; however, their content nevertheless might require tagging.

For the exemplary equation given above, the scientific elements are separated into elements requiring tagging: π, x, α and ( ) and elements that do not require tagging: 2, +, Σ and sin.

In stage 7, optionally and preferably basic scientific standardization is applied. This stage is preferably performed in order to translate different mathematical expressions that are identical in concept into a single form. Non-limiting examples of such standardizations include: Roots are being translated to appropriate powers: square root to 0.5, cube root to 0.33; Division symbol is being translated into FractionElement: 1/x to $$\frac{1}{x};$$

and so forth.

The above method for inputting equations may optionally be used for a wide variety of applications, including but not limited to inputting an equation for mathematical software to solve; entering such equations for the purpose of visual display in some type of document, which may for example be a textual document, a mark-up language document such as a web page, a display document (for example for creating an image or for presenting in a slide show); providing such equations by a student during a test or examination for automated grading and for self-teaching; voice to text recognition, such that a person may verbally recite an equation, after which it is then analyzed and provided in a visual manner; and for providing autocompleted equations, so that once a part of an equation is entered, the rest is completed automatically. An exemplary non-limiting application of the above method with regard to search is described in greater detail below.

Figure 6:
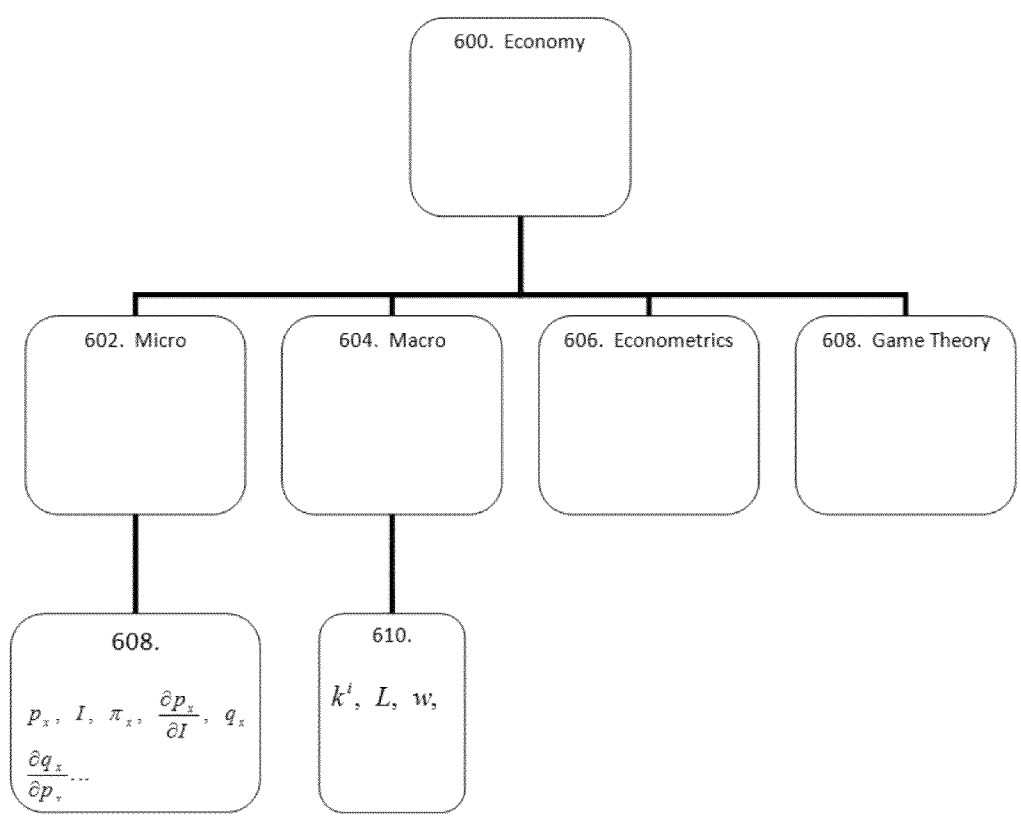
FIG. 6 shows an exemplary classification method for a particular field according to at least some embodiments of the present invention.

FIG. 6 shows an exemplary sub-classification method for a particular subject according to at least some embodiments of the present invention. For this non limiting example, the subject is "economy". As shown, the main category economy (600) is preferably divided into a plurality of categories, such as micro-economics (602), macro economics (604), econometrics (606) and game theory (608). Within each sub-category, preferably a plurality of symbols and notation are defined in relation to it. The probability for certain combination of tagged symbols to be part off a certain field, sub-field or sub-sub-field is determined by the engine after it acquired the needed data. For example, such a plurality of symbols and notation are shown for micro-economics (610) and for macro-economics (612) as non-limiting examples only.

Figure 7:
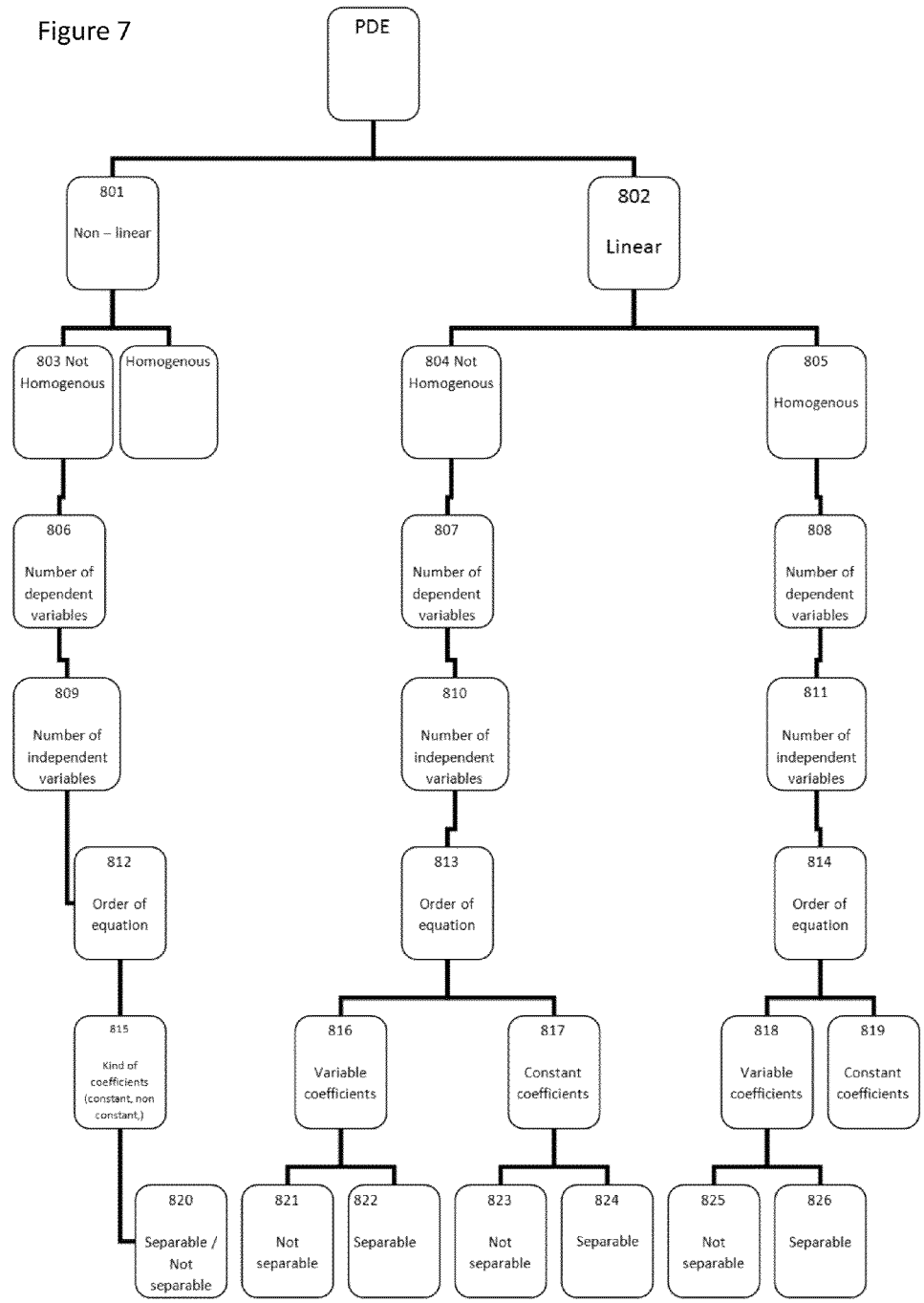
FIG. 7 shows an exemplary method for categorizing of the equation within the subfield dependent of the crucial features (sub-sub-field) according to at least some embodiments of the present invention.

FIG. 7 shows an exemplary method for analyzing an equation for a particular subject according to at least some embodiments of the present invention. This figure is an example for one full algorithm as sub-subject is determined for PDEs (partial differential equations). The engine preferably uses a specific method for PDE's in order to categorize such equations; of course, the method illustrated is exemplary and non-limiting. First of all the engine checks if the equation is linear (modules 801 and 802), then it checks if it is homogenous etc (subsequent stages 803-805). Next, dependent and independent variables are checked in stages 806-811.

Next the order of the equation is checked, in stages 812-814, followed by determining constant and variable coefficients in stages 815-819. It is then preferably determined whether the coefficients/variables are separable or not separable, in stages 820-826.

When the actual search is being performed, for each stage an article or other document resulting from the search gets a 0 (did not have the characteristic of the original equation) or 1 (it did). The results of each subsequent stage are optionally weighted less, in terms of importance for determining a match or lack thereof, than the results of the previous stage. For instance, if the original equation is linear, and two results appear in the search, featuring different documents—one featuring a linear equation and one not, then the linear one will have a better match (for example with a higher score), even if all the other features don't match the original equation, and all of the other features of the non-linear equation do match the original equation.

As a non-limiting example, consider the following equation:

$$\frac{\partial^2 u}{\partial t \partial x} = 2u\frac{\partial u}{\partial x} + 4u\frac{\partial u}{\partial x} - \frac{\partial^3 u}{\partial x^3}$$

As described in greater detail below, the equation is segmented and the symbols are labeled (tagged), followed by construction of a generic form of the equation as follows:

$u \rightarrow f_1$ (dependent variable)

$x \rightarrow y_1$ (independent variable)

$t \rightarrow y_2$ (independent variable)

Differential—subscript with the independent variables differentiating and their degree
Example:

$$\frac{\partial^3 u}{\partial x^3} \to f_1 Dif[y_1, 3],$$

$$\frac{\partial^2 u}{\partial t \partial x} \to f_1 Dif[\{y_2, 1\}, \{y_1, 1\}],$$

$$2u\frac{\partial u}{\partial x} \to (2*f_1)*f_1 Dif[y_1, 1]$$

Expressions with the same differentials are add/subtracted and the coefficients are put into brackets if needed $$\frac{\partial^2 u}{\partial t \partial x} = 2u\frac{\partial u}{\partial x} + 4u\frac{\partial u}{\partial x} - \frac{\partial^3 u}{\partial x^3} \to \frac{\partial^2 u}{\partial t \partial x} = 6u\frac{\partial u}{\partial x} - \frac{\partial^3 u}{\partial x^3}$$

Every side of the equality is analyzed and so is the explicit equation:

$$\frac{\partial^2 u}{\partial t \partial x} - 6u\frac{\partial u}{\partial x} + \frac{\partial^3 u}{\partial x^3}$$

Next the generic form is analyzed as follows, to classify the equation:
1. The sign "Dif"—the expression is a differential expression
2. There are two independent variables—the expression is a PDE
3. There is one coefficient that has an independent variable—Nonlinear
4. The degree of the differential of the different parts is drawn—all of the of the degrees are 1 and more—non-homogenous
5. Number of dependent variables is 1—"one dependent variable"
6. Number of independent variables is 2—"two independent variables"
7. Order of equation is 3 (highest differential)—"3 degree"
8. After that the number of coefficients and their powers (all the analysis described earlier) is done on the coefficients of every differentiation combination without stating the exact signs ($y_1$ or $y_2$) in order to broaden the search and the expressions being differentiated without addition of keywords.
9. The tags are added to the keywords of the article.

Figure 8:
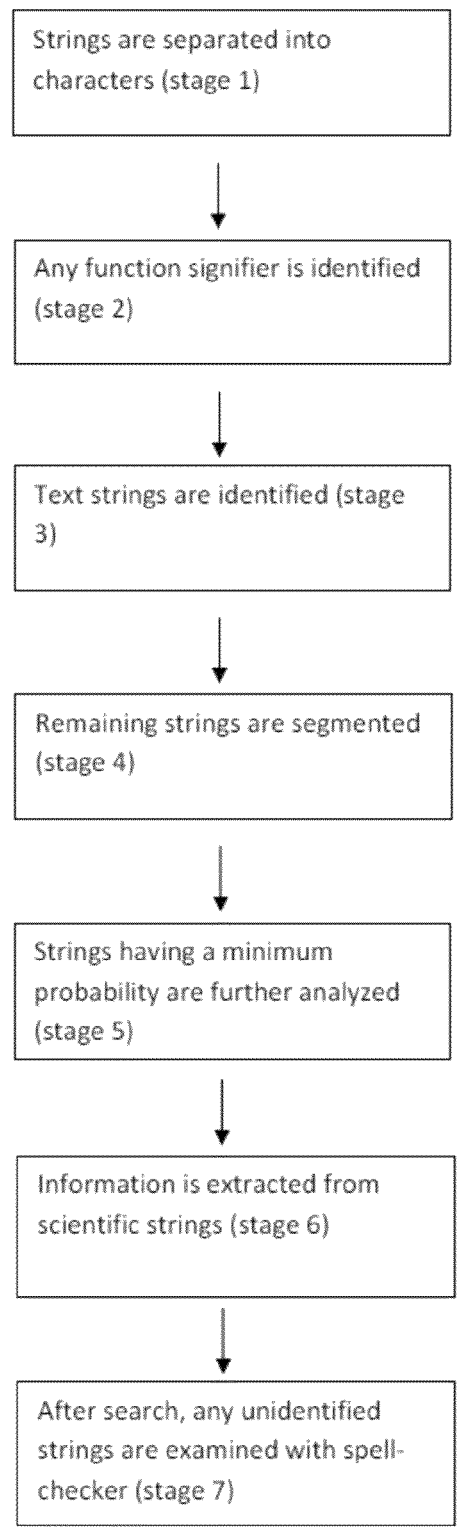
FIG. 8 shows an exemplary method for separating text from an equation or other expression before the equation or other expression is analyzed according to at least some embodiments of the present invention.

FIG. 8 shows an exemplary method for separating text from an equation or other expression before the equation or other expression is analyzed according to at least some embodiments of the present invention. This method is described with regard to the non-limiting example of the following equation:

$$\sum x_n + y_n \text{ particle } \sin(x+y)\frac{a}{b} adn \text{ for } n \in N.$$

This equation is translated into machine language as follows (forward-slash ("/") indicates the start of a function and spaces are replaced by ampersands ("&")):\sumx$_n$+y$_n$&particle&sin(x&+&y)&a/b/\&for&n\inN.

The stages of separation between text and scientific or mathematical expressions is preferably performed as described below:
1. The query is divided to all the segments separated by a space bar "_"
   1) \sumx$_n$+y$_n$
   2) particle
   3) sin(x
   4) +
   5) y)
   6) a/b
   7) adn
   8) for
   9) n\in N
2. Strings with "\" are analyzed character by character until a symbol from the LaTeX inventory is identified, as a non-limiting example of a known mathematical format or language for which optionally a particular analysis process may be provided according to at least some embodiments of the present invention. Thus, 1) and 9) are identified as scientific expressions

| String | \sumx$_n$ + y$_n$ | particle | sin(x | + | y) | a/b | adn | for | n\inN |
|---|---|---|---|---|---|---|---|---|---|
| Family | Sci | | | | | | | | Sci |

3. Text strings are optionally identified as follows. Strings that are comprised only of alphabetical characters and with more than 3 of them are identified as text.

| String | \sumx$_n$ + y$_n$ | particle | sin(x | + | y) | a/b | adn | for | n\inN |
|---|---|---|---|---|---|---|---|---|---|
| Family | Sci | text | | | | | | | Sci |

Strings of 2 or three alphabetical characters only are matched with words present in the vocabulary. If matched, they are identified as text.

| String | \sumx$_n$ + y$_n$ | particle | sin(x | + | y) | a/b | adn | for | n\inN |
|---|---|---|---|---|---|---|---|---|---|
| Family | Sci | text | | | | | | text | Sci |

4. The remaining strings are unidentified and are examined individually, to determine whether they relate to a scientific expression or feature some type of error. The above described segmentation process is performed on each unidentified string separately.
5. Strings having a probable identification below a certain threshold are not included in the search. The others are tagged as scientific strings.

| String | \sumx$_n$ + y$_n$ | particle | sin(x | + | y) | a/b | adn | for | n\inN |
|---|---|---|---|---|---|---|---|---|---|
| Family | Sci | text | Sci | Sci | Sci | ? | | text | Sci |

6. For science:
   1) If between two scientific boxes there was a text words, then they are automatically considered to be separate formulas.

| formula | \sumx$_n$ + y$_n$ | n\inN | sin(x + y) | a/b |
|---|---|---|---|---|
| number | 1 | 2 | 3? 3?4? 3?4?5? | 3?4?5?6 |

2) Arithmetic operators are chunked to the expression after them if they are last (and not as a super or subscript) and to the expressions before them if they are first (both if they stand alone in the string).
3) Forward operators as int, lim, $$\frac{\partial}{\partial x}$$

are chunked to the scientific part after them.
4) Other space bar separations are looked at as different expressions.

| | formula | | | |
|---|---|---|---|---|
| | \sumx$_n$ + y$_n$ | n\inN | sin(x + y) | a/b |
| number | 1 | 2 | 3 | 4 |

7. After the search is conducted the unidentified strings are offered to the user with a spell checker, as they may contain a mistake.

Figure 9A:
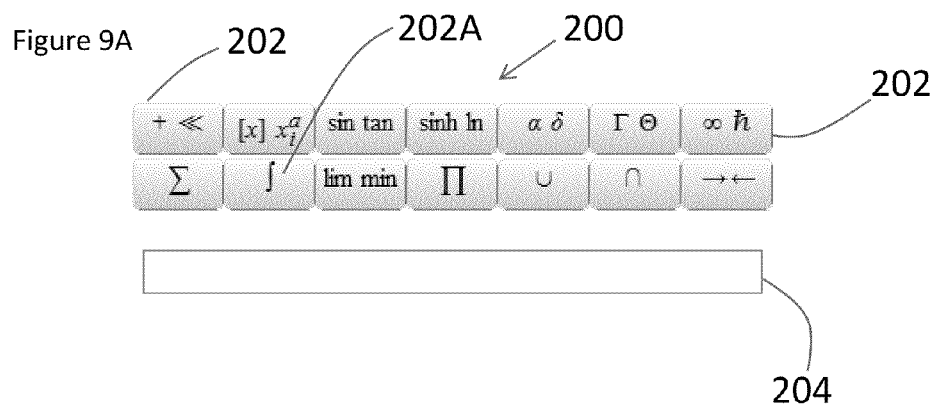
FIG. 9 shows a non-limiting, illustrative WYSIWYG interface according to at least some embodiments of the present invention.
Figure 9B:
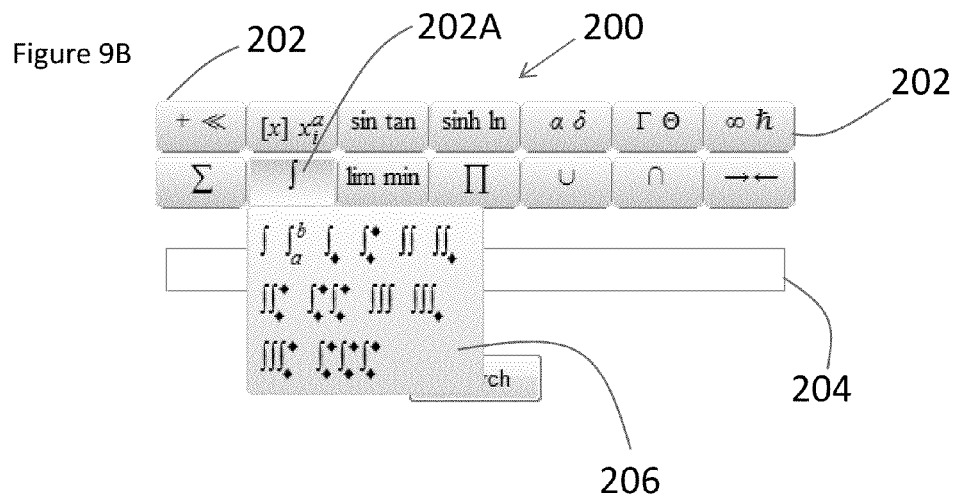
Figure 9C:
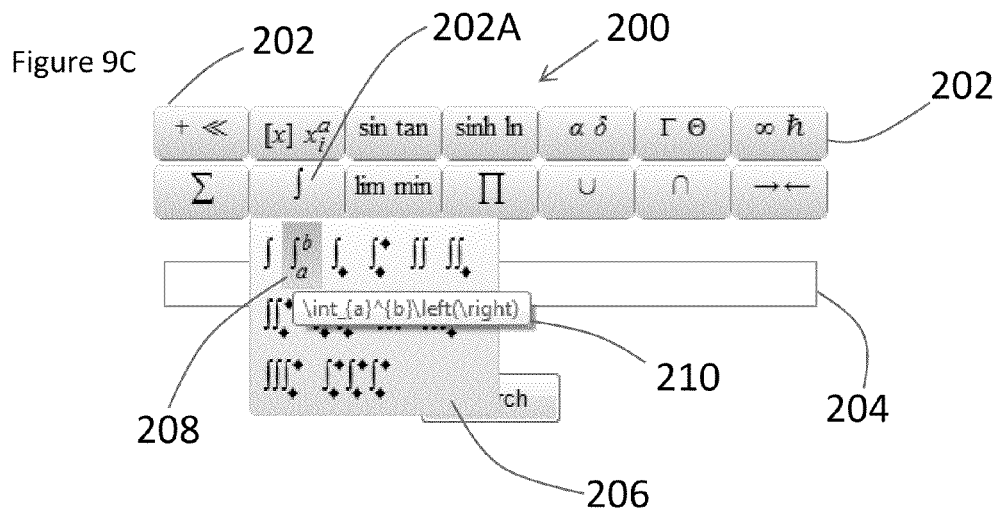
Figure 9D:
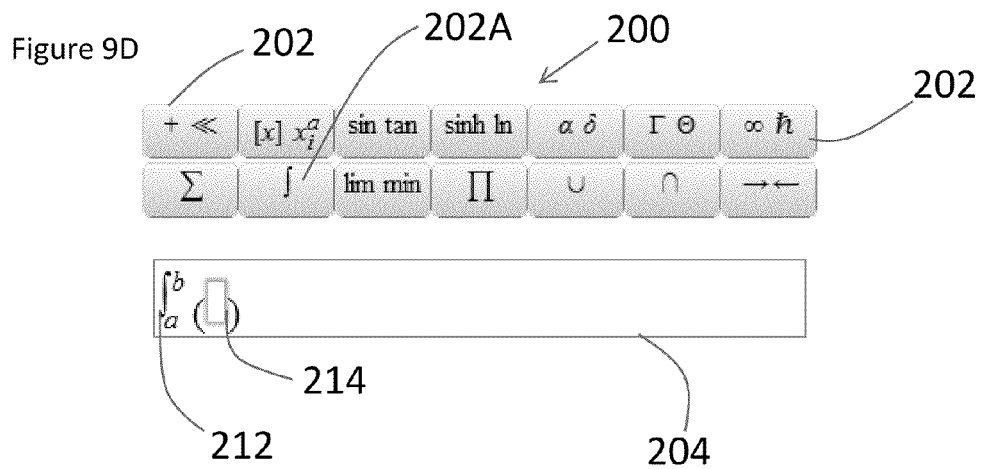
Figure 9E:
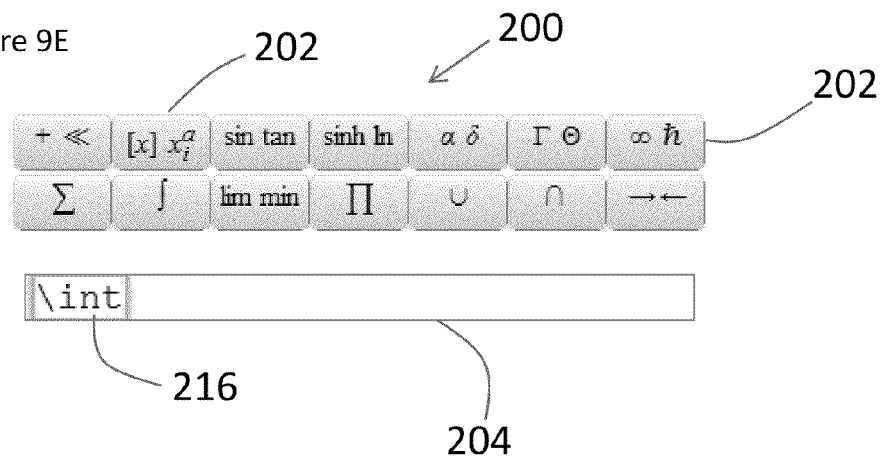
Figure 9F:
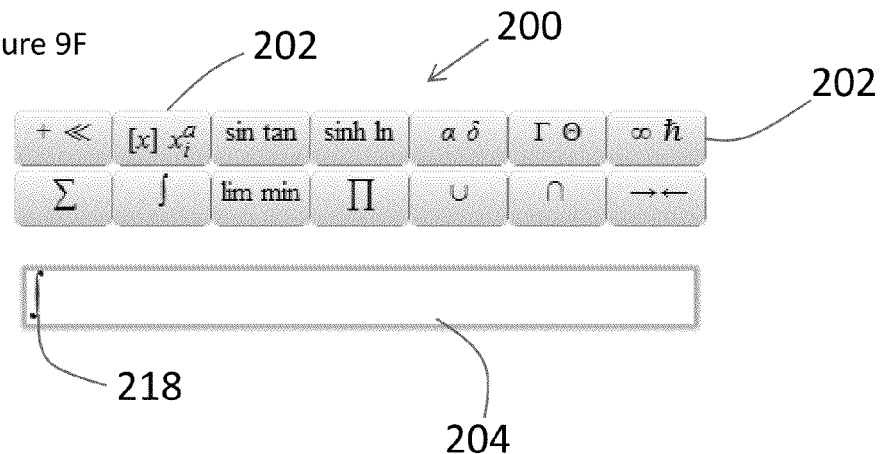

FIGS. 9A-9F show non-limiting, illustrative partial user interfaces according to at least some embodiments of the present invention, which for example could optionally be supported by equation display 112. FIGS. 9A-9D relate to an optional implementation of an optional GUI (graphical user interface), for example the WYSIWYG environment described with regard to FIG. 1. FIGS. 9E-9F relate to an optional implementation of an optional interface which features LaTeX as a non-limiting example of a symbolic language.

As shown in FIG. 9A, a partial interface 200 is provided with a plurality of symbol category tabs 202 above a display area 204. Each symbol category tab 202 represents a plurality of symbols from which a selection may be made if the respective tab 202 is selected (without limitation) with a mouse or other pointing device, or optionally with a touch screen or the like (not shown).

Assuming for the sake of discussion that the user selects tab 202A, then a menu 206 or other set of selection choices is then displayed, for example as shown in FIG. 9B. Menu 206 provides a plurality of related symbols from which a selection may be made by the user, again without limitation by using a mouse or other pointing device, or optionally with a touch screen or the like (not shown).

The user may optionally indicate a particular symbol 208, with a mouse or other pointing device (optionally by "mousing over"), or with a touch screen (not shown). Once a particular symbol 208 has been indicated, optionally an explanation or related information is provided in an explanation box 210, as shown with regard to FIG. 9C. In this non-limiting example, explanation box 210 contains the LaTeX representation of indicated symbol 208.

Once the user selects the desired symbol 208, then the representation 212 of the symbol 208 appears in display area 204, as shown with regard to FIG. 9D. Optionally, a placeholder 214 may be provided as shown, indicating that a further input of one or more mathematical components is required or optionally may be provided.

FIGS. 9E and 9F relate to an optional implementation of an optional interface which features LaTeX as a non-limiting example of a symbolic language. Items with the same function as in FIGS. 9A-9D have the same reference numbers.

As shown, in FIG. 9E, the user has entered the characters "\int" as a non-limiting example of a LaTeX string 216 in display area 204. The user then preferably presses "enter" (not shown) or otherwise indicates that the string is complete, after which the string is converted to the actual symbol(s) represented by the string, shown in FIG. 9F as converted symbol 218. Optionally, symbols may be added through a keyboard shortcut as well.

Figure 10:
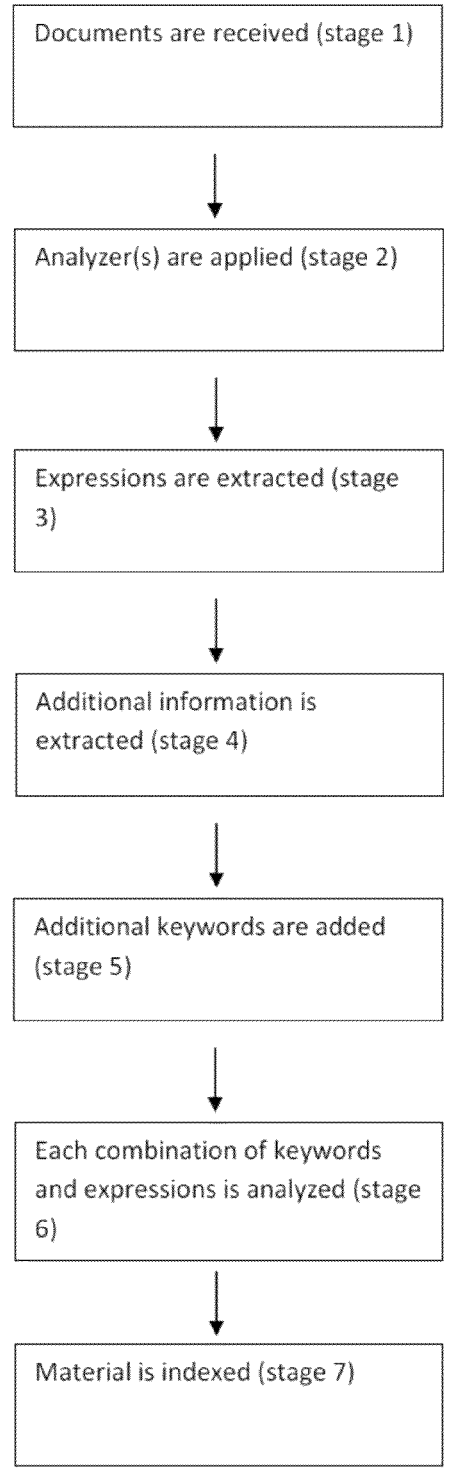
FIG. 10 shows an exemplary, illustrative non-limiting method for performing an indexing process according to at least some embodiments of the present invention.

FIG. 10 shows an exemplary, illustrative non-limiting method for performing an indexing process according to at least some embodiments of the present invention. This indexing process is optionally supplementary to any process performed by any other type of known search engine in the art, and provides the necessary information regarding expressions such as equations for comparing documents to a query comprising such an expression.

As shown, in stage 1, a plurality of documents, optionally in different formats, is received. In stage 2, one or more analyzers is applied to each such document. Non-limiting examples of such analyzers include XML analyzers for specific types of documents, such as for Wikipedia documents for example, and/or for documents containing particular types of formats for equations and other expressions, such as for LaTeX for example.

Each scientific and/or mathematical expression is extracted, for example optionally according to a repository as previously described, in stage 3. In stage 4, optionally information such as titles, abstracts, authors, body text and so forth is extracted.

In stage 5, optionally additional keywords are added by analyzing the title, body text and other types of information regarding the article.

In stage 6, each combination of keywords and expressions is preferably analyzed as previously described with regard to the analysis of a query from the user, in a mirror process.

In stage 7, the indexing information is added to a database or otherwise made accessible to a search engine as described herein.

Figure 11:
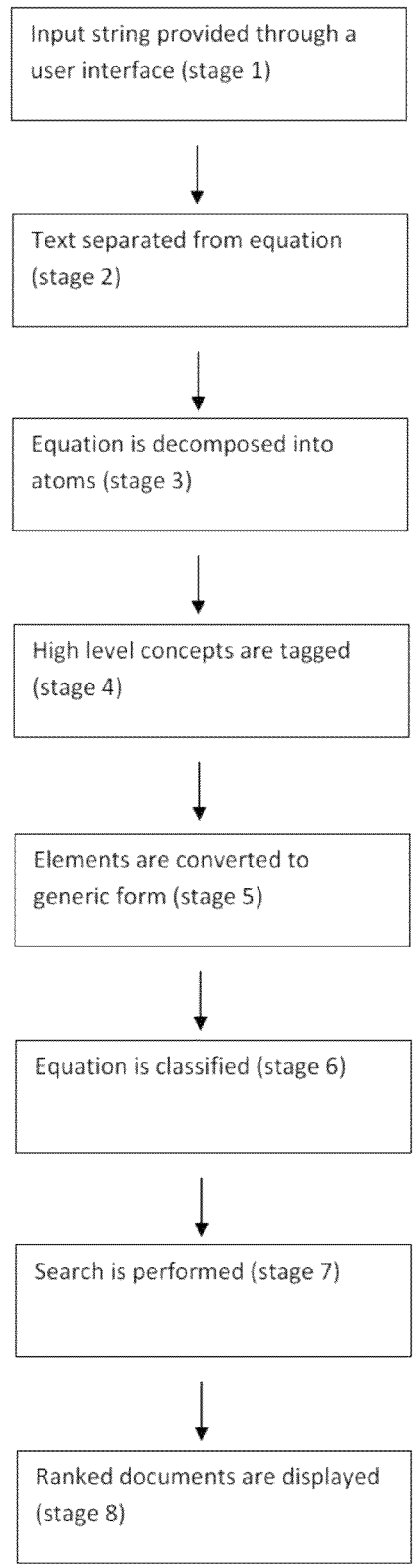
FIG. 11 shows an exemplary, illustrative non-limiting method for analyzing an input search string which comprises an equation for performing a search according to at least some embodiments of the present invention.

FIG. 11 shows an exemplary, illustrative non-limiting method for analyzing an input search string which comprises an equation for performing a search according to at least some embodiments of the present invention. As shown, in stage 1, an input string is provided by a user through a user interface, as previously described. Of course, other methods could also optionally be used to enter such a string, for example including but not limited to any type of software interface, such as LaTeX, Maple and so forth.

In stage 2, the text is separated from the equation. The text may then optionally be segmented or decomposed into a plurality of words according to any known linguistic method. Optionally, the separation process may be aided through the use of a repository having a set of known keywords from various scientific, technical and/or mathematical fields; once each such keyword is recognized, it may optionally be automatically separated.

Figure 12:
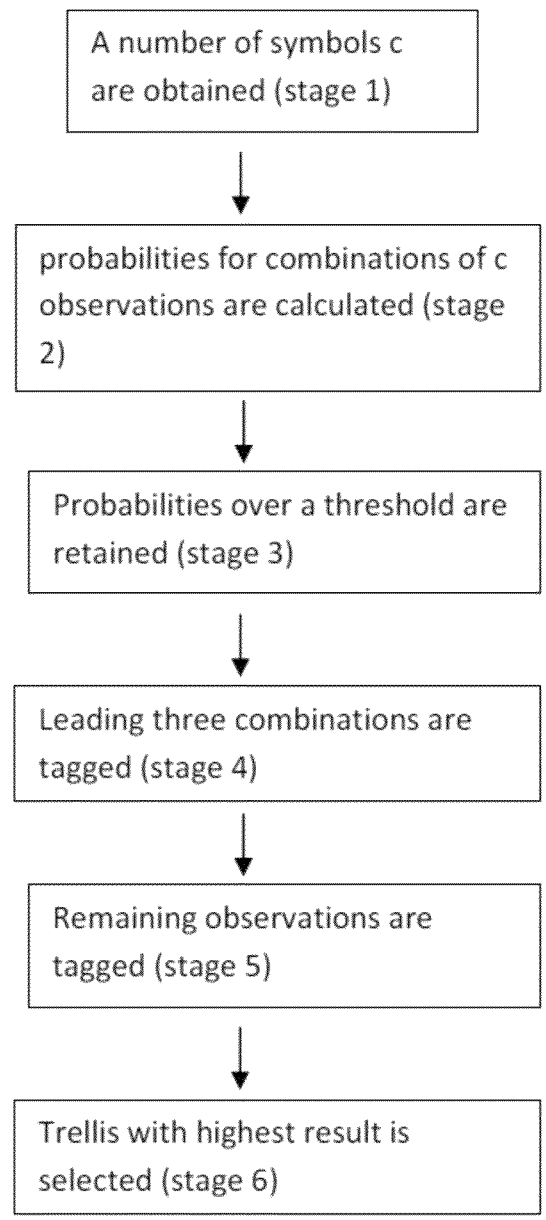
FIG. 12 shows a non-limiting, illustrative method for implementing a DHMM according to at least some embodiments of the present invention.

In stage 3, the equation is decomposed into atoms (elements) according to a segmentation method, described briefly above with regard to the non-limiting method of FIG. 3 and described in greater detail with regard to the method of FIG. 12.

In stage 4, the high level concepts within each string are optionally and preferably tagged (during the search process itself, this tagging process is preferably used for the documents being searched). With regard to tagging the input string, preferably the tags relate to the keywords (separated in stage 2) and/or the symbols that are present, in order to provide information regarding the relevant scientific, technical and/or mathematical field; again the repository of stage 2 may optionally be used for this stage.

In stage 5, the elements are preferably converted to a more generic, standardized form. For example, all variables, operators and constants are preferably converted to a general form, such that all variables may optionally be designated "v1, v2 . . . " etc as a non-limiting example. Also preferably all equation features or tokens are changed to an explicit function, such that for the below transition matrix of the method of FIG. 12, each cell preferably features one of these tokens.

There are two kinds of signs in general, operators and all the rest.
  i. Operators are signs that operate on other signs, usually variables and numbers. Since they have a certain roles, it is convenient to write them in a way that specifies exactly the role of the operator.

Examples for integrals,
General Rules:
When the operator from the list stands alone, then it should start with a capital letter.
If it is the first of an operator within an operator, then the first one begins with a
Example: $\int_0^1 x^2 dx \rightarrow \text{Int}[x^\wedge 2, \{x,0,1\}]$
Example: $\Sigma_i \int_0^1 x_i^2 dx \rightarrow \text{Sum}[\text{int}[x^\wedge 2,\{x,0,1\}],\{I,NA,NA\}]$
Integration
Single Integral: $\int$
General: Int[Expression, {The variable being integrated, subscript, superscript}]
Wherever there is no sign, NA should appear.
Examples:
$\int_0^1 x^2 dx \rightarrow \text{Int}[x^\wedge 2,\{x,0,1\}]$
$\int x^2 dx \rightarrow \text{Int}[x^\wedge 2,\{x,NA,NA\}]$
$\int x^2 \rightarrow \text{Int}[x^\wedge 2,\{NA,NA,NA\}]$
$\int_R x^2 \rightarrow \text{Int}[x^\wedge 2,\{NA,R,NA\}]$
$\int f(x)dx \rightarrow \text{Int}[f,\{x,NA,NA\}]$
$\int_A dw \rightarrow \text{Int}[NA,\{w,A,NA\}]$
Remarks: If prior to the integral there are only signs that are not "The variable being integrated" that multiply the integral, transfer them into the integral (only then).
Examples:

$$\frac{1}{2}\int_a^b \frac{1}{x}dx \rightarrow \int_a^b \frac{1}{2}\frac{1}{x}dx$$
$$x\int_a^b \frac{1}{x}dx \rightarrow x\int_a^b \frac{1}{x}dx \left(\text{not } \int_a^b x\frac{1}{x}dx\right)$$

Double Integral: $\iint$
Explanation:
General: iint[expr, {The first variable being integrated from the right, the first subscript from the left, the first superscript from the left}, {The second variable being integrated from the right, The second subscript from the left, the second superscript from the left}]
General Example: $\int_c^d \int_a^b xy \, dxdy \rightarrow \text{Iint}[xy,\{y,c,d\},\{x,a,b\}]$
Another Example: $\int_0^1 \int_0^x \sin(xy) dy dx \rightarrow \text{Iint}[\sin(xy),\{x,0,1\},\{y,0,x\}]$
Particular Examples:
$\iint_T f(x,y) dx dy \rightarrow \text{Iint}[C\{y,NA,NA\},\{x,T,NA\}]$
$\int_a^b dx \int_{\alpha(x)}^{\beta(x)} f(x,y) dy \rightarrow \text{Iint}[f,\{x,a,b\},\{y,\alpha(x),\beta(x)\}]$
Triple Integral Iiint[ . . . ].

The logic is exactly the same as in the double integral case.
Examples:

$$\iiint_D f(x,y,z)dxdydz \rightarrow$$
$$\text{Iiint}[f,\{z,NA,NA\},\{y,NA,NA\},\{x,D,NA\}]$$

$$\iiint_T f(\rho\cos\phi,\rho\sin\phi,z)\rho \, d\rho d\phi dz \rightarrow$$
$$\text{Iiint}[f\rho,\{z,NA,NA\},\{\phi,NA,NA\},\{\rho,T,NA\}]$$

$$\iiint_T (\rho^2+z)\rho \, d\rho d\phi dz \rightarrow$$
$$\text{iiint}[(\rho^2+z)\rho,\{z,NA,NA\},\{\phi,NA,NA\},\{\rho,T,NA\}]$$

$$\int_0^{2\pi} d\phi \int_0^{3\alpha} \rho^3 d\rho \int_{-\sqrt{9\alpha^2-\rho^2}}^{\sqrt{9\alpha^2-\rho^2}} dz \rightarrow$$
$$\text{Iiint}[\rho^3,\{\phi,0,2\pi\},\{\rho,0,3\alpha\},\{z,-\sqrt{9\alpha^2-\rho^2},\sqrt{9\alpha^2-\rho^2}\}]$$

Special cases:

$$\int_{R^3} \frac{G}{|x-y|} \rho(y) d^3y \rightarrow$$
$$\text{Iiint}\left[\frac{G}{|x-y|}\rho(y), \{NA,NA,NA\}, \{NA,NA,NA\}, \{y,R^{\wedge}3,NA\}\right]$$

$$\int_{R^2} f \rightarrow \text{Iint}[f,\{NA,NA,NA\},\{NA,R^{\wedge}2,NA\}]$$

The same logic is used for Limits, sums, Differentials . . .
  ii. All the other signs are usually variables, groups, numbers, etc. . . .
Possible states are independent variable, dependent variable, wildcard constant, rational known constant (½ or 0.5, for example), summation, etc, . . . .
An example of the visual representation is

| Meaning | Visual representation |
| --- | --- |
| Independent variable | $y_0, y_1, y_2, \ldots$ |
| Dependent variable | $f_0, f_1, f_2, \ldots$ |
| Constant wildcards | $a_0, a_1, a_2, \ldots$ |
| Variable integers | $n_0, n_1, n_2, \ldots$ |

Known numbers are just written as their value, but have a state tagged to them describing the number family they belong to $$\left(\frac{1}{2},\right.$$

Rational, for example).

In stage 6, the equation is preferably classified, optionally and preferably according to a combination of the tokens and the above described keywords and/or high level concepts. Such classification preferably also enables the tokens or features of the equation to be divided as follows:

Features which must match: these binary important features must be present for another equation to be considered a match.

Features which may match to increase relevance determine the mathematical semantic closeness of two equations, optionally in a hierarchical manner.

The remaining feature are bonus features, which have little or no theoretical mathematical importance, but do have some contextual relevancy regarding the field of interests and visual similarity These features are mainly used to rank potential matches, for example for results which have similar ranking with regard to the first two sets of features.

In stage 7, optionally the search is performed and documents are ranked according to the above features. Such ranked documents are then optionally displayed to the user in stage 8.

FIG. 12 shows an exemplary, illustrative non-limiting method for implementing the DHMM (Dynamic Hidden Markov Model) according to at least some embodiments of the present invention. The DHMM is provided as a non-limiting example of a dynamic mathematical model which is able to determine semantic connections between elements of an expression without regard to order (or optionally without a requirement for a predetermined order), according to at least some embodiments of the present invention. Optionally any such dynamic mathematical model, or non-dynamic mathematical models (such as the HMM) may be used with any embodiment of the present invention as described herein, as the present invention is not limited to implementation with any particular mathematical model.

The DHMM builds upon, and improves upon, the Hidden Markov Model (HMM). The HMM is well known in the art and is described for example in "Speech and Language Processing. An Introduction to Natural Language Processing, Computational Linguistics, and Speech Recognition", Second Edition, by Daniel Jurafsky and James H. Martin (2009; Prentice-Hall), which is hereby incorporated by reference as if fully set forth herein, at least with regard to Sections III and IV. A brief description of the HMM is provided below; however it should be noted that according to at least some embodiments of the present invention, the HMM may optionally be used in place of the DHMM, for example optionally wherein order of the symbols or observations is predetermined or is determined through some other mechanism.

HMM—Brief Explanation

The HMM is a sequence classifier, i.e., a model whose job is to assign some label or class to each unit in a sequence.

For example, in speech recognition, the HMM is designed to label a sequence of sounds to certain phones, and then phonemes in a language. After the phonemes are assigned, the HMM is used to label the sequence of phonemes as words.

Before explaining the model, it is important to introduce a few key notations and assumptions:

States: The HMM is intended for labeling the meaning of certain symbols in the material to be analyzed. For example, the words from an audio file, the real author behind the pseudonym credited for a book with distinct syntax (this was the original purpose of the model), etc. The states are represented by the notations $Q=q_1q_2 \ldots q_M$ A set of M states.

Markov chain: One of the underlying assumptions of the model is that the states are dependent on the other states present in the observations. Thus, it is important to evaluate the probability of going from one state to another one.

Markov assumption: In most HMM there is an assumption that the current state is dependent only on the previous one, i.e., $P(q_i|q_1, q_2, \ldots q_{i-1}) = P(q_i|q_{i-1})$. When trigram approach is adopted, the assumption is that the current state is dependent on the two previous observations $P(q_i|q_1,q_2,\ldots,q_{i-1})=P(q_i|q_{i-1}, q_{i-2}))$ The probability of transitioning to a certain state can be represented by a transition probability matrix defined as following:

$A=a_{01}a_{02} \ldots a_{n1} \ldots a_{nn}$ A transition probability matrix A, each $a_{ij}$ representing the probability of moving from state i to state j, s.t.

$$\sum_{j=1}^{n} a_{ij} = 1, \forall i.$$

$q_O, q_F$ a special start state and end state which are not associated with observations.

The hidden part of this model refers to the fact that states to be determined are not directly observed. For example, if one wishes to determine the sequence of weather via the data of the amounts of ice creams eaten per a day, the weather is actually hidden at first. Only the ice cream consumption is known from the observations. Thus, the observations are known, but the desired information is hidden. Formally, Given a sequence of observations, O, figure out the correct 'hidden' sequence Q that caused this observation.

Described Formally:

$Q=q_1q_2 \ldots q_M$ A set of M states.

$A=a_{01}q_{02} \ldots a_{n1} \ldots a_{nn}$ A transition probability matrix A, each $a_{ij}$ representing the probability of moving from state i to state j, s.t.

$$\sum_{j=1}^{n} a_{ij} = 1, \forall i.$$

$O=o_1o_2 \ldots o_T$ A sequence of T observations, each one having a hidden state drawn from that vocabulary $B=b_i(o_t)$ A sequence of observation likelihoods: also called emission probabilities each expressing the probability of an observation $o_t$ being generated from a state $i$. These are the independent probabilities since they are not related to the other observations' states.

$q_O, q_F$ A special start state and end state which are not associated with observations.

The above description relates to a first order HMM. The two assumptions were that a state is dependent only on the previous one, and, that the probability of an output observation $o_t$ is dependent only on the state $q_i$ that produced the observation.

It is important to mention that sometimes the model has to take into account not only the previous observation, but sometimes the two, or three previous observations. When two observations are taken into account the model is named a trigram (as opposed to bigram when only the previous observation is taken into account). When the model is a trigram model, the transition matrix is $A=a_{123}a_{124} \ldots a_{12N} \ldots a_{132} \ldots a_{13N} \ldots a_{1NN} \ldots a_{23N} \ldots a_{NNN}$ where each $a_{knm}$ representing the probability of moving from state k,n to state m, s.t.

$$\sum_{m=1}^{N} a_{knm} = 1, \forall kn.$$

The trigram is used herein for descriptive purposes only, without wishing to be restricted or limited to a trigram only.

When creating an HMM, there are three fundamental problems that need to be characterized:

Problem 1 (Computing Likelihood): Given an HMM $\lambda=(A, B)$ and an observation sequence O, determine the likelihood of $P(O|\lambda)$.

Problem 2 (Decoding): Given an observation sequence O and a HMM=$\lambda=(A,B)$, discover the best hidden state sequence Q.

Problem 3 (Learning): Given an observation sequence O and the set of states in the HMM, learn the HMM parameters A and B.

Computing Likelihood: The forward algorithm.

Given an HMM $\lambda=(A,B)$ and an observation sequence O, determine the likelihood of $P(O|\lambda)$.

Assumption: In this model there is a one-to-one mapping between the states and the observations. Thus, if the observations are $O=o_1 o_2 \ldots o_T$, then the states that produced them were $Q=q_1 q_2 \ldots q_T$.

For computational efficiency reasons, the forward algorithm is used in order to determine the most likely sequence.

The Forward algorithm: The forward algorithm computes the observation probability by summing over the probabilities of all possible hidden state paths that could generate the observation sequence, but it does so efficiently by implicitly folding each of these paths into a single forward trellis.

$\alpha_t$ (j) The probability of being in state j after the first t observations, given the automaton $\lambda$.

The value of each cell $\alpha_t(j)$ is computed by summing over the probabilities of every path that could lead us to this cell. Formally this is expressed via $\alpha_t(j)=P(o_1, o_2, \ldots, o_t, q_t=j|\lambda)$. Here, $q_t=j$ means "that the t state of the sequence is j". This is computed by $$\alpha_t(j) = \sum_{i=1}^{T} \alpha_{t-1}(i) a_{ij} b_j(o_t).$$

When using the trigram formulation, this will appear as $$\alpha_t(k) = \sum_{i=1}^{T} \sum_{j=1}^{T} \alpha_{t-2}(i) \alpha_{t-1}(j) \left(1 - \frac{1}{2}\delta_{ij}\right) a_{ijk} b_k(o_t).$$

Here $\delta_{ij}$ is the Kroenecker delta and the aim is to avoid over-weighing repeated paths. For $\alpha_1$: $\alpha_t(k)=a_{00k} b_k(o_t)$ and for $\alpha_2$:

$$\alpha_t(k) = \sum_{j=1}^{T} \alpha_{t-1}(j) a_{0jk} b_k(o_t).$$

Decoding:

Decoding: Given an observation sequence $O=o_1 o_2 \ldots o_T$ and a HMM=$\lambda=(A,B)$, discover the best hidden state sequence $Q=q_1 q_2 \ldots q_T$.

The decoding stage is used in order to determine which sequence is the underlying source behind the observations. In theory, all of the combinations of the forward algorithm may be assembled, followed by selection of those that surpass a certain threshold. However, all of these combinations are $N^T$. Thus, the leading combinations for each three steps are optionally selected, such that the calculations are only performed for the ones surpassing a certain threshold, or a pre-determined number of leading combinations (but not all the combinations). Formally, one would calculate all the combinations for $$\alpha_t(k) = \sum_{i=1}^{T} \sum_{j=1}^{T} \alpha_{t-2}(i) \alpha_{t-1}(j) \left(1 - \frac{1}{2}\delta_{ij}\right) a_{ijk} b_k(o_t)$$

every three steps and then save only a few combinations are potentially good until that point.

Training HMM's:

Learning: Given an observation sequence O and the set of states in the HMM, learn the HMM parameters A and B.

It should be noted that in standard HMM models the assumption is that the states are dependent on the previous hidden state, i.e., the observation order is pre-determined and can be used in order to tag the states. However, the best observation order for determining the hidden states most accurately may not necessarily be known when interpreting equations and other expressions. Thus, preferably the correct observation order is determined dynamically, as the path propagates. Moreover, the number of states is not initially equal to the number of observations, which is also handled by the DHMM (dynamic HMM) according to at least some embodiments of the present invention.

DHMM—Brief Explanation

A brief description of the DHMM is provided according to at least some embodiments of the present invention, which as previously described, builds upon the HMM and which may optionally be used in place of the HMM according to at least some embodiments of the present invention. The below non-limiting example is used to explain the DHMM, on the basis of a set of T states.

$V=v_1, v_2, \ldots, v_N$ A vocabulary of states.

Examples of states: Independent variable, wildcard constant, summation operator.

$O=o_1 o_2 \ldots o_T$ A sequence of different state observations (the order is not yet determined).

Examples of such a sequence:

For a+b+cos(x) there are 5 observations: (a, b, +, x, cos)

For $\int x^n + n \cdot a$ there are 7 observations:

($\int$, x, n superscript of x, +, n, ·, a)

Each observation is drawn from a certain vocabulary. The vocabulary is a repository of all the strings ever encountered which may be featured in a single observation, for example, x, y, cos, $\int$, ... x, y, $\int$, sin, ....

If a new "word" is encountered, then it may optionally be added to the repository (a non-limiting example of such a repository was previously given).

Every "word" in the vocabulary has, in theory, N states it can belong to. Since in reality that is not the case (as a non-limiting example, the symbol $\int$ will never mean a "wildcard constant"), each "word" $vr_j$ may be considered to have the $N_j$ states possible for "word" j. $N_j$ is a vector which stands for the group of the states but it does not mean that if the number of states of $N_j$ is 4, then $N_{j_1}=1$, $N_{j_2}=2$. The states are composed of $N_j-1$ specific states (as independent variables, known rational constant, open group, etc. ... ). The state $N_{j_0}$ is preferably designated as the uncertainty state. If a particular word is found be a constant, then the value of that constant forms a new state for the word (if it had not previously been designated to potentially have that constant value). $N_{j_{Nj}}$ symbolizes such an occurrence.

The uncertainty state or index may be described as follows. The meaning of the uncertainty index is that there is no knowledge regarding the state.

Example: let us assume that an expression contains, among others, $+y \cdot e^{\pi \cdot i}$. Assume that (x, y, π) were already tagged. Now the symbol i is to be tagged. Out of ten times that (x, y) were in an expression with i, one time they were connected with i being an integer variable and it was never an imaginary number, but 9 times the two observations has nothing to do with i. On the other hand, out of 4 times that (e, π) were in an expression with i, 3 times they were connected to it being an imaginary number, and one time they were connected with it being an integer variable. Thus, although when (x, y) are connected to i it is more likely to be an integer variable, these symbols are rarely ever connected to it and that has to be taken into account when tagging it. This situation is described more clearly below.

A certain observation can appear more than once in an expression. For example, in the expression $n \cdot x + y'' + 2 \cdot n = 0$ the variable n is encountered three times. In this case, two of the occurrences were the same (n·x and 2·n), but one occurrence had position importance (superscript). Thus, one say that there were two different observations (and not three) of n. In that case, if n is indexed (in this stage, arbitrarily) as $o_4$, then $o_4$ should have two sub-groups. If the normal non-position dependent index is 1 and the superscript is 3, then the observation is $o_{4_1}$. Then the complete observation is $o_{4_2}$. In general, when an observation contains the same vocabulary with a few meaningful repetitions (repetitions that have some difference in the data they contain), then they are assigned $o_{t_{R_t}}$ ($R_t$ being the number of repetitions with different position importance for observation t: in the example above, $|R_t|=2$). The $R_t$ would contain the specific occurrences (1, 3 in this case).).

Remark: The non-position importance observation is always taken into account, even if there is only a position dependent observation present for a vr.

Position Importance: Some observations' meaning (i.e., state) have no dependency on their position, while others do. As a general rule, when a commutative operator as + or · stands between two observations, then the position has no meaning. On the other hand, when a non-commutative operator, or a sign that has the potential of being non-commutative stands between two operators, then the position has, potentially, importance.

Example: For $\Sigma_{i=1}^n i \cdot x$, i will be saved twice (just i for the case of i·x and i subscript of Σ for the case of $\Sigma_{i=1}^n$). It is important to emphasize that although the observation $o_t$ can be comprised of several same-sign observation that are dependent differently with respect on and to other signs, the assumption is that they do all have one meaning. This mechanism's role is to take the specific observation that gives the best likelihood of a correct sequence classification.

Example: For $\int x'' + n \cdot a$ there are 7 observations:
(∫, x, n superscript of x, +, n, ·, a)

Here the observation of n has two sub-observations: if the observation of the n signs is $o_2$, then $|R_t|=2$, $R_2=(1, 3)$. $o_{2_1}$=n, $o_{2_3}$=n superscript of x.

The observation's likelihood is:
$b_i(o_{y_{r_t}})$ for i=1, ..., N for t=1, ..., T for $r_t$=1, ..., $R_t$, which means the probability of observation o to be in state i. This is the independent probability of the observation's state.

Example: for $\Sigma_{i=1}^n i \cdot x$, if the state of an independent variable is state number 3, the state of a constant is 2, the observation of x is 4, the odds that x is an independent variable is 60% and the odds that x is a constant are 10%, then $b_2(o_4)$= 0.1, $b_3(o_4)$=0.6.

Remark: It is important to understand that the index of the observation varies from sequence to sequence (expression to expression). The index of the states, on the other hand, are global and thus do not differ.

Transition Matrix: the transition matrix is built from the cells that depict the connection between different symbols' Visual Representations (VR or "words") and the other VR states present in an expression. Furthermore, they represent the connections between the VR states that have position relevancy and the states of the position they depend on.

Each cell is labeled as $a_{k_i n_j}$ which means the following: the probability that VR indexed at n is in state j if VR indexed at k is in state i.

Example: Let us assume that the index of VR "x" is 3 and state "independent variable" is indexed at 1. Moreover, VR "n" is indexed at 4 and the states "integer variable" and "dependent variable" are indexed as states 4 and 2 respectively. Let us say that "x" was tagged as being in state "independent variable" and the machine now needs to tag "n" (this is an example that objects to clarify. The algorithm is going to be explained in detail later). The chance that "n" is in state "integer variable" is 0.4 if we take into account that "x" is at state "independent variable" is. The chance that "n" is in state "dependent variable" is 0.2 if we take into account that "x" is at state "independent variable" is. The chance that "n" is not correlated to "x" when it is at state "independent variable" is 0.3. Thus, $a_{3_1 4_4}$=0.4, $a_{3_1 4_2}$=0.2 and $a_{3_1 4_0}$=0.3.

It is important to keep in mind that this algorithm is not restricted to bigrams, in which only one other symbol is considered. In fact, in the following pages, the formalistic will be one of a trigram (two previous symbols).

The transition matrix is a form of formalizing the relationships between different states, or, in other words, how much does one state affect the outcome of deduction of a certain "word" (VR).

In order to construct the transition matrix, it is necessary to relate to the issue of position dependency. There are two kinds of states in the transition matrix, position dependent and non-position dependent.

Non-Position Dependent: When an observation is dependent on another observation whose state was tagged, then both the string comprising the observation and the state are considered.

Example: For $a'' + b'' = c''$ the state of c is dependent on b and a with no importance to their position in the expression with relation to c. Thus, if a, for example, was tagged as an independent variable, then the state would appear as (sign—a, Semanitcs—independent variable), or just (a, independent variable).

Position Dependent: When an observation is dependent on another observation and its position, then the state includes not only the VR and state, but also the position on which the VR depends, and the state of whatever is in that position.

Example: For $$1 + \frac{y}{3} + x^n = c$$

the observation of n is saved both as n and as n superscript of x, as was described earlier. For n superscript of x the dependence on the base (x in this example), will be only on its state. Thus, for n, one of the transition cells will be (VR—n, Semanitcs—integer variable, superscript dependent on base, variable).

1. In summary, the information required for symbols that are not position dependent is the VR ("word" itself) and its state (or meaning). However, for the symbols that are position dependent, the following information is required:

({vr of current observation, position, state of the position that the symbol depends on}, meaning) Or 2. ({vr of current observation, position, vr of the position that the symbol depends on}, meaning)

If the position the current observation is dependent on was labeled, then the first option is always taken into account, otherwise, the second option is taken into account.

It may be confusing that one vector has two features and the other 4, but in the case of position dependence the first place contains 3 features ({VR, position, state of the position that the sign depends on}). This renders the system more generic and automatically handles the dependence of these three features on the outcome of the state.

A certain observation can have dependencies that are both position dependent and not position dependent. The cells that relate to the first case will be handled as described for the non-position dependent case, while the cells that relate to the second case will be handled as described for the position dependent case.

The cells in the transition matrix are described as follows: $a_{j_i}$—j (subscript)—the index of the VR, i (sub—subscript)—the index of the state.

In order to clarify, the cell of the transition matrix for a trigram is described as follows: $a_{k_i n_j m_l}$ which may described as the probability that VR m is in state l if one assumes that VR k is in state i and VR n is in state j.

Formally, the transition matrix is defined as following:

$$A = a_{1_1 2_1 3_0}, a_{1_2 2_1 3_0}, \ldots, a_{1_{N_1} 2_1 3_0}, \ldots, a_{1_1 2_2 3_0},$$
$$\ldots, a_{1_1 2_{N_2} 3_0}, \ldots, a_{1_1 2_1 3_1}, \ldots, a_{1_1 4_1 3_0}, \ldots,$$
$$a_{1_1 vr_{VR_1} 3_0}, \ldots, a_{vr_{VR-2_{N_{vr_{VR-2}}}} vr_{VR-1_{N_{vr_{VR-1}}}} vr_{R_{N_{vr_{VR}}}}}$$

A transition probability matrix A s.t. $\Sigma_{i \in N_m} a_{k_i n_j m_l} = 1$ (here the indexes are for the actual states, unlike for the computations of the trellises, where their meaning is the state for a certain observation)

The transition matrix is used in the DHMM such that the DHMM forms a machine learning mathematical model which has three parts: computing likelihood, decoding and learning, each of which is described briefly below; the learning method is described in greater detail below.

Computing Likelihood Given an (D)HMM $\lambda=(A, B)$ and an observation sequence O, determine the likelihood of $P(O|\lambda)$. In other words, when encountering a string of parsed symbols or observations, this process involves computationally determining the likelihood that the observations are in certain states.

For computational efficiency reasons, according to at least some embodiments of the present invention, the forward algorithm is used in order to determine the most likely sequence. Neither the model nor the present invention is restricted to implementations with the forward algorithm alone.

The forward algorithm computes the observation probability by summing over the probabilities of all possible hidden state paths that could generate the observation sequence, but it does so efficiently by implicitly folding each of these paths into a single forward trellis.

$\alpha_t(j)$ The probability of being in state j after the first t observations, given the automaton $\lambda$.

The value of each cell $\zeta_t(j)$ is computed by summing over the probabilities of every path that could lead us to this cell. Formally this is expressed via $\alpha_t(j)=P(o_1, o_2, \ldots o_t, q_t=j|\lambda)$. Here, $q_t=j$ means "that the t state of the sequence is j". This is computed by $$\alpha_t(j) = \sum_{i=1}^{T} \alpha_{t-1}(i) a_{ij} b_j(o_t).$$

When using the trigram formulation, this will appear as $$\alpha_t(k) = \sum_{i=1}^{T} \sum_{j=1}^{T} \alpha_{t-2}(i) \alpha_{t-1}(j) \left(1 - \frac{1}{2} \delta_{ij}\right) a_{ijk} b_k(o_t).$$

Here $\delta_{ij}$ is the Kroenecker delta and the aim is to avoid over-weighing repeated paths. For $\alpha_1: \alpha_t(k) = a_{00k} b_k(o_t)$ and for $$\alpha_2: \alpha_t(k) = \sum_{j=1}^{T} \alpha_{t-1}(j) a_{0k} b_k(o_t).$$

It is important to clarify the following regarding the index of i $\Sigma_{i=1}^{N}$: The numbers do not refer to the actual index of the state, but rather, to the state of the observation number i that its state was identified (from V).

Decoding: Given an observation sequence O and a HMM $\lambda=(A,B)$, discover the best hidden state sequence Q. In other words, this process involves choosing the most likely set of states given a certain expression (a set that consists of both structured and non-structured observations).

The decoding stage is used in order to determine which sequence is the underlying source behind the observations. In theory, one can take all the combinations of the forward algorithm and choose the ones that surpass a certain threshold (or take a number of the leading combinations). The problem with such a process is that the combinations would be $N^T$. Thus, optionally and preferably, only the leading combinations for each three steps are considered as described below. Furthermore, also optionally and preferably, the calculations are only performed for the combinations surpassing a certain threshold, or for a certain (preferably predetermined) number of leading combinations (but not all the combinations). Formally, calculations are performed for combinations for $$\alpha_t(k) = \sum_{i=1}^{T} \sum_{j=1}^{T} \alpha_{t-2}(i) \alpha_{t-1}(j) \left(1 - \frac{1}{2} \delta_{ij}\right) a_{ijk} b_k(o_t)$$

every three steps and then save only a few combinations are potentially good until that point.

Learning: Given an observation sequence O and the set of states in the HMM, learn the HMM parameters A and B. In other words, this process depends upon providing a model that enables the machine to learn, thus enabling it to deduce the likelihoods of different observations' states.

Before continuing with a description of the tagging process, there is a need to provide a few definitions:

The number of times VR $vr_j$ appeared in expressions is $Rep(vr_j)$

The number of times VR $vr_j$ was in state k is $Rep(vr_j^k)$

The sign "logical and" is $\cap$

The sign "logical or" is $\cup$

The number of different states for the set of states $N_j$ is $|N_j|$

The number of different independent states is $N_j^{ind} = N_j$, $j \neq 0$ (without the uncertainty index).

The number of different independent states for the set of states $N_j$ is $|N_j^{ind}| = |N_j - 1|$ $a_{n_k m j_i}$—what is the strength of dependence that VR j is in state i if we assume that VR n is in state k and VR m is in state l $a_{n_k m j_i}^{old}$—Before current learning session.

$a_{n_k m j_i}^{new}$—After current learning session.

$|M_{n_k m j}^{old}|$—The number of times that VR n was in state k, VR m was in state l and VR j appeared before this learning session.

$|M_{n_k m j}^{new}| = |M_{n_k m j}^{old}| + 1$—The number of times that VR n was in state k, VR m was in state l and VR j appeared after this learning session.

$|M_{n_k m j_i}^{old}|$—The number of times that VR n was in state k, VR m was in state l and VR j was in state i before this learning session.

$|M_{n_k m j_i}^{old}|$—The number of times that VR n was in state k, VR m was in state l and VR j was in state i after this learning session.

coupled states—$n_k m_l$ In words, VR n was in state k, VR m was in state l $N(vr_j)$—number of times the VR $vr_j$ was encountered $N(vr_j \cap vr_p)$—The number of time that VR $vr_j$ and VR $vr_p$ were encountered in the same expression.

$N(vr_j \cap v_p^m)$—The number of times that VR $vr_j$ was in state k and VR $vr_p$ was in state m in the same expression.

When there is one observation to be tagged:

The tag is done via $\max_i b_i(vr_j)$

When there are exactly 2 observations with two VRs ($vr_j$, $vr_p$) to be tagged:

$$\max_{k,m} P(vr_j^k \cap vr_p^m | vr_j \wedge vr_p) = \max_{k,m} \frac{N(vr_j^k \cap vr_p^m)}{N(vr_j \cap vr_p)}$$

In the case there are 2 observations with more than 2 VRs (in this case one of the observations has two VRs) $vr_{j,1}$, $vr_{j,2}$, $vr_p$ ( )

$$\max\left(\max_{k,m} \frac{N(vr_{j,1}^k \cap vr_p^m)}{N(vr_j \cap vr_p)}, \max_{q,m} \frac{N(vr_{j,2}^q \cap vr_p^m)}{N(vr_j \cap vr_p)}\right)$$

When there are exactly 3 observations with three VRs ($vr_j$, $vr_p$, $vr_l$) to be tagged:

$$\max_{k,m,q}(vr_j^k \cap vr_p^m \cap vr_l^q | vr_j \wedge vr_p \wedge vr_l) = \max_{k,m,q} \frac{N(vr_j^k \cap vr_p^m \cap vr_l^q)}{N(vr_j \cap vr_p \cap vr_l)}$$

In the case of 3 observations with more than three VRs the logic is identical to the previous example.

Turning now to FIG. 12, in order to solve the problem of the unknown dependencies for a situation in which there are more than three observations, optionally and preferably the following non-limiting method is applied (this non-limiting example is for the trigram approach and is described with regard to an equation for the purpose of description only). In this method, the equation is decomposed into a plurality of atoms, which are semantically analyzed and tagged.

In stage 1, a predetermined number of symbols c are obtained. For this non-limiting example of a trigram, c=3, so three symbols are obtained, preferably possessing two features: the symbols can be tagged correctly with high probability; and these symbols hold information with which it is possible to tag the other symbols in the equation with high probability.

Assume that the expressions contain 3<T observations—$O = o_1 o_2 \ldots o_t \ldots o_T$ Notations Clarification:

$o_{j,r,k}$ or $o_{j,k}$—Observation of VR with index position r (r=1 or no r implies that only a VR with no dependence on position is present) and observation number k.

$o_{j,r,k}^i$ or $o_{j,k}^i$—The same as before but after being tagged at state i.

j, j', j", . . . Implies different VRs r, r', r", . . . Implies different position dependence of VRs.

i, i', i", . . . —implies states

In stage 2, all the probabilities for combinations of c (here the calculations for c=3 are considered) observations having particular states are calculated:

$$P(o_{j,r}^i, o_{j',r'}^{i'} o_{j'',r''}^{i''} | vr_{j,r} \wedge vr_{j',r'} \wedge vr_{j'',r''}).$$

In stage 3, only those probabilities passing a certain threshold, or only a maximum number of combinations, are further considered.

For every combination in stage 3, the following process is performed in stage 4:

a. The three observations that were tagged are given the indexes k, k' . . . $\in$ K=1, 2, 3. $j_i^k$ is the VR and state of observation number k. The rest of the observations are given numbers between s, s' . . . $\in$S=1 . . . (T−3). Furthermore, tagged state are indexed with i, i' . . . and those that haven't been tagged are index l, l' . . . .

b. The following is calculated: for every s=1 . . . (T−3) the probability of the other observations being tagged correctly depending only on the three tagged observations is calculated:

$$\Pi_{s \in S}^{T-3} \max_{k,k'} \max_l b_l(o_{j,s}) \cdot a_{j_i^k j_i^{k'} j_l^s}.$$

b. The n leading threes that provided the highest results are then selected. In this non-limiting example, two such results are selected.

In stage 5, once the leading three combinations have been tagged with the highest results, then the remaining observations may be tagged as follows:

a. For each of the leading three observations the observation that can be tagged with the highest probability is selected and the probability is calculated: $\max_{k,k'} \max_{s \in S} \max_i b_i(o_{j,s}) \cdot a_{j_i^k j_i^{k'} j_i^s}$.

b. Next, one or two of the leading results are selected for tagging and are tagged (optionally more may be tagged).

c. Now k, k' . . . $\in$K=1, 2, 3, 4 and s, s' . . . $\in$S=1 . . . (T−4). The observation that was tagged may be used in order to better identify the future observations. As more observations are tagged, the results improve; this process is continued for each forward trellis.

The process continues until all observations were tagged for all trellises and the trellis with the probabilistically highest result is selected in stage 6.

Specific Non-limiting, Illustrating Examples for Performing the Above Process

Some notes are provided below to assist in understanding the specific examples, which are provided below.

Analyzing special operators:
- Special operators: integrals, sums, product, unions, intersections, limits.
- The operator are written in a standardized form: For example, if we encounter $\int y_0 dy_0 + \int (y_0+y_0^2) dy_0$ then it is transformed into $\int (2 \cdot y_0 + y_0^2) dy_0$.
- For the presence of a particular symbol, for example for performing a comparison with a document, there is a specific place in the comparison vector that states 1 if the symbol is present and 0 if it is not. For anything with numbers the appropriate number is placed in a specific cell. All the search and existence functions of strings are standard.
- The number of single operators ($\int\int y_0^2$) and their type (integral, double integral, sum, ... ) is determined
- The number of operators within operators is determined ($\Sigma_{i=1}^n \int a_i x^i$) and their type
- Number of different kinds of special operators (The number of times that a double sum was present, for example)
- Then every special operator is isolated $$\left(\int x^2 + x \cdot \sum_{i=1}^{\infty} \frac{1}{n} \to \left(\int x^2, +x \cdot \sum_{i=1}^{\infty} \frac{1}{n}\right)\right)$$

- The dimension of each special operator is saved ($\rho-1$, $\Sigma\Sigma-2$)
- Whatever that can be moved from the coefficients to the area inside the special operator without changing the meaning is moved ($a_0 \int y_0 \to \int a_0 y_0$, but $y_0 \int y_0$ stays the same)
- The expression inside the special operators and whatever remained in the coefficients of the operators (whatever comes immediately before the operator) are analyzed high level resolution. The analysis is going to be elaborated later.
- All the borders of the special operators are analyzed as well low level resolution. The analysis is going to be elaborated later.

Remark: For expressions that have a given solution, like $$\sum_{n=1}^{\infty} \frac{1}{n^2} = \frac{\pi}{6}$$

the given solution is preferably retained, for example for display to the user.

Analyzing absolute operators and Brac Kets (a physics operator). In this section the system looks for the following signs and gives as outputs the number of times they are being repeated. Moreover, for norms there is an analysis of the subscript (low level). For most of the signs there is an analysis of superscript (low level)
- Absolute | |
- Norms ‖ ‖
- Brak <|
- Kets |>
- Brac-kets ⟨ ‖ ⟩
- Inner brac-kets ⟨ | ⟩
- Outer Brac-kets |><|

The expression within these operators is then pulled out and placed in the rest of the expression for further analysis.

The number of $\infty$, $-\infty$ signs outside the special operators is counted.

Inequality: The presence of different kinds of inequalities are counted and then substituted by "−". The inequalities are
$<, >,$ The number of different dependent and independent variables are counted (as they are all written in generic form as explained earlier).

If the expression is one that holds no special meaning for dependent VS independent variables, like an simple algebraic expression, then all the dependent variables are given independent signs. On the other hand, for expression which do hold different meanings for these states, like integrals or differential expression, the original visual representation is kept.

Simplifying the expression visually:
- Transforming the expression into numerator and denominator.
- Verifying that the denominator always has more + signs than −. If there are more − signs than + then both the numerator and denominator are multiplied by −1.
- Then the trigonometric, hyperbolic and exponential, logarithmic, etc. ... identities are used in order write the expression in a more generic way emphasizing that in terms of trig and hyperbolic expression, they will be written in the shortest way in terms of number of strings.
- In order to refine the analysis, the expression in the numerator and denominator are divided into parts: By referring to part, it I meant that only + or − separate them, for example:

$$\cos x + (x+y)^{\frac{1}{2}} + a \cdot (x-y) \text{ then the parts are } + \cos x,$$
$$+(x+y)^{\frac{1}{2}}, +ax, -ay$$

Analyzing each part: What signs are present:
- Only algebra
- Cos
- Sin
- Tan
- Cos and sin
- Cos and tan.
- The analysis continues for all combinations of cos sin tan tanh cosh sinh ln log exp sec sech ...

The existence of each different kind of part is saved.

The algebraic and exponential parts are part is expanded (($(x+y)^2 \to x^2+y^2+2xy$)

For each part the coefficients, powers and inside the base are analyzed high level High level analysis
- For variables, variables integers, wildcard constants and known numbers the following, among other, is analyzed:
  - The existence of powers and how many
  - What the nature of the powers are (numbers, other expressions, variables integers in powers, numerators and denominators in powers) etc.
  - Repetitions
  - Number of different parts as described earlier Existence of powers on the powers and the nature of them Etc. . . .

Low level analysis

Mainly existence of different kinds of signs within that regions and the presence of division with different variables ion the numerator.

Other analysis include

Number of +, − signs

The different signs present in all the expression

The number of different parts

The VR of the signs prior to the tagging . . .

As a result, the output is a matrix comprised, depending in the expression, on different tokens.

According to at least some embodiments of the present invention, the mathematical function may be searched even if different but mathematically equivalent symbols are used within the equation, as described in greater detail above. For example, symbols representing variables in an equation such as "a" and "b" may be considered to be mathematically equivalent in certain circumstances, although they are different symbols. The function, once the symbols are categorized via the DHMM, is preferably converted to a standardized internal format for searching, thereby overcoming such apparent differences which in fact do not impact upon the mathematical interpretation of the function.

Figure 13:
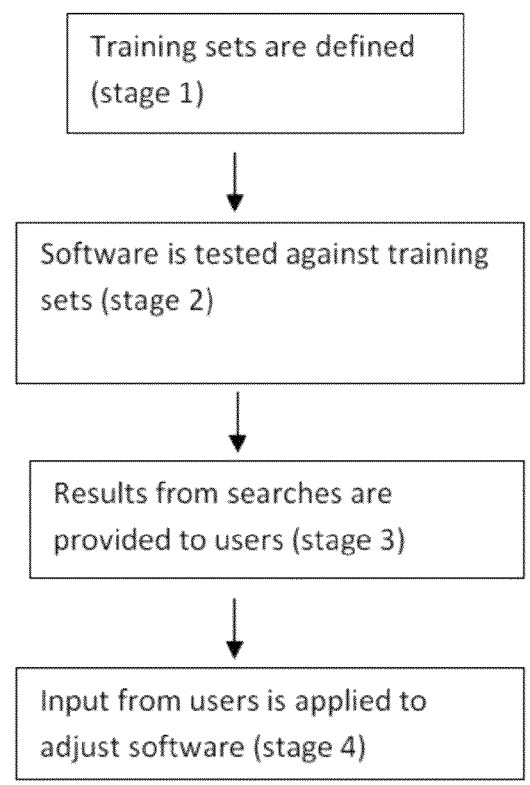
FIG. 13 shows an exemplar, non-limiting illustrative method for machine learning with regard to a mathematical model such as the DHMM according to least some embodiments of the present invention.

FIG. 13 shows an exemplary, non-limiting illustrative method for machine learning with regard to a mathematical model such as the DHMM according to least some embodiments of the present invention.

Some non-limiting definitions are provided for the below explanation.

A planted page is one that does not have the leading SL (symbol labeling) relative to the query, deliberately. The purpose is to plant these results that have the second, third or fourth most likely trellis in order to check the deduction of the machine. These results may for example optionally be provided in a database on which the software is tested.

A known formula is one that has a final grade that is within one standard deviation of a totally learned trellis (all the SL are considered as learned)

$$\sigma_{known\ trellis} = \frac{\sigma_{a_{n_k m_l j_i}}^{picked}}{\sqrt{T}},$$

where T is the number of observations in that trellis.

In stage 1, a training set of correct SL queries and both correct and incorrect SL results in pages (documents) is built and statistics are determined. A similar process is followed to construct a training set of incorrect SL queries. The training set is preferably provided manually or at least with manual curation.

In stage 2, the previously described software, preferably operating with the DHMM, is tested against the training set, in an automatic process.

In stage 3, the results of one or more test searches performed by the software are optionally and preferably then provided to one or more users.

In stage 4, input is obtained from users, optionally as described below (however some type of user based, manual input is preferably obtained to determine whether the software is operating correctly):

A. For results that may not be correct:

a. For every search, statistics are gathered regarding the user's click rate for each result provided to the user depending on the total rank, the non-scientific rank, the value of the SL trellis and the statistics gathered from the training set.

b. When a particular result is clicked less often than the $4\sigma$ below average than a correct one, it is considered to be an incorrect result.

c. The analysis of the equation is changed and the next most likely trellis is selected, which is searched again.

d. The process continues until it is no longer labeled incorrectly.

e. If the different trellises were exhausted and it is still considered incorrectly labeled, then the second most likely $b_i(o_j)$ is picked.

f. If the expression is still considered to be incorrectly labeled then the next most probable independent state is assumed.

g. The process continues until the expression is considered to be correctly labeled.

B. When, for a query, the planted results are clicked more often than the $3\sigma$ above average than for known queries, or the "next page" button is clicked more often than the $3\sigma$ above average than for known queries then the query is considered to be incorrectly analyzed.

a. The analysis of the equation is changed and the next most likely trellis is selected, which is searched again.

b. The process continues until it is no longer labeled incorrectly.

c. If the different trellises were exhausted and it is still considered incorrectly labeled, then the second most likely $b_i(o_j)$ is picked.

d. If the expression is still considered to be incorrectly labeled then the next most probable independent state is assumed.

e. The process continues until the expression is considered to be correctly labeled.

C. When a query or index gets exceptionally good grades, the equation receives a "correct" score or feedback.

Remark: In the indexing part, the observations include textual words, though with significant differences regarding their role in the model in comparison to the scientific notation. The words aren't tagged but when entering the second stage (after a leading three was chosen), they act like observations and taken into account (the probability that "group theory" affects the outcome of A for instance). All keywords in the indexing are taken into account automatically.

The training method may optionally be extended as described herein. Optionally different learning mechanisms for teaching the machine (the DHMM model as operated by a computer in this non-limiting example) are provided in order to maximize its improvement and induction capabilities. Thus, here are introduced 4 variations of learning methods:

For all the learning methods $|M_{n_j m_j}^{new}|$ is updated

1. Full training: Here the involvement of the user is maximal. It is intended for "super-users"—those who have complete administrative authorization.

For regular training

The user's actions:

A. The user tags each element in the expression.

B. The user marks all the other VR that helped him make the decision for each VR. In other words, the question the "super user" is answering is as following: for each specific sign and state, what were the states that helped you tag it as you did.

The machine's computation: If a certain observation that was, in fact VR $v_j$ was tagged as state i, then A. The repetition is updated:

a. The number of times the VR $v_j$ appeared: $Rep^{new}(vr_j) = Rep^{old}(vr_j) + 1$ b. The number of times the VR $v_j$ appeared in state i: $Rep^{new}(vr_j^i) = Rep^{old}(vr_j^i) + 1$ B. The independent probabilities:
  a. The independent probability that $v_j$ is in state k is updated:

$$b_i^{new}(vr_j) = b_i^{old}(vr_j) + \frac{1}{Rep^{old}(vr_j)+1},$$

or, in other words, $$b_i^{new}(vr_j) = \frac{Rep^{new}(vr_j^i)}{Rep^{new}(vr_j)}.$$

b. The independent probabilities that $v_j$ is in other states (all the nonzero states, off course): $\forall l \in N_j$ (for all the states of VR $v_j$), $l \neq i$ (that isn't equal to the state i), $$b_l^{new}(vr_j) = b_l^{old}(vr_j) - \frac{1}{|N_j^{ind}-1|}\frac{1}{(Rep^{old}(v_j)+1)}.$$

$|N_j^{ind}-1|$ is the number of independent states possible for $v_j$ excluding the state that has been chosen. As a consequence, $$\sum_{l=1}^{N_j^{ind}} b_l^{new}(vr_j) = b_i^{new}(vr_j) + \sum_{l=1, l \neq i}^{N_j^{ind}} b_l^{new}(vr_j) = b_i^{old}(vr_j) + \frac{1}{Rep^{old}(vr_j)+1} +$$

$$\sum_{l=1, l \neq i}^{N_j^{ind}} \left( b_l^{old}(vr_j) - \frac{1}{|N_j^{ind}-1|}\frac{1}{(Rep^{old}(vr_j)+1)} \right) =$$

$$b_i^{old}(vr_j) + \frac{1}{Rep^{old}(v_{rj})+1} - \frac{|N_j^{ind}-1|}{|N_j^{ind}-1|}\frac{1}{(Rep^{old}(vr_j)+1)} +$$

$$\sum_{l=1, l \neq i}^{N_j^{ind}} (b_l^{old}(vr_j)) = b_i^{old}(vr_j) + \sum_{l=1, l \neq i}^{N_j^{ind}} (b_l^{old}(vr_j)) = \sum_{l=1}^{N_j^{ind}} b_l^{old}(vr_j) = 1$$

and both are equal to 1. In the case that there is only one possible state, then no updating is done.

C. The transition matrix: For this part we should remember the definition of the transition matrix's cells: $a_{n_k m_l j_i}$ — what is the probability that VR j is in state i if we assume that VR n is in state k and VR m is in state l.
Remark: When there is position dependence the VR is comprised of {VR, position, state of the position that the sign depends on}
  a. The computer has all the combinations of coupled different states present in the expression that do not have the same VR (meaning that position VR and regular VR do not affect one another).
  b. For the case that both $n_k$ and $m_l$ affected $j_i$:

i. $a_{n_k m_l j_i}^{new} = a_{n_k m_l j_i}^{old} + \frac{1}{|M_{n_k m_l j}^{old}|+1}$ ii. $\forall h \in N_j$ (for all the states of VR $v_j$), $h \neq i$ (that isn't equal to the state i)

$a_{n_k m_l j_h}^{new} = a_{n_k m_l j_h}^{old} - \frac{1}{|N_j-1|}\frac{1}{|M_{n_k m_l j}^{old}|+1}$ c. For the case that both $n_k$ and $m_l$ did not affect $j_i$:

i. $a_{n_k m_l j_0}^{new} = a_{n_k m_l j_0}^{old} + \frac{1}{|M_{n_k m_l j}^{old}|+1}$ ii. $\forall h \in N_j$ (for all the states of VR $v_j$), $h \neq 0$ (that isn't equal to the state i)

$a_{n_k m_l j_h}^{new} = a_{n_k m_l j_h}^{old} - \frac{1}{|N_j-1|}\frac{1}{|M_{n_k m_l j}^{old}|+1}$ d. For the case that $n_k$ or $m_l$ affected $j_i$, but not both:

i. $a_{n_k m_l j_0}^{new} = a_{n_k m_l j_0}^{old} + \frac{1}{2}\frac{1}{|M_{n_k m_l j}^{old}|+1}$ ii. $a_{n_k m_l j_i}^{new} = a_{n_k m_l j_i}^{old} + \frac{1}{2}\frac{1}{|M_{n_k m_l j}^{old}|+1}$ iii. $\forall h \in N_j$ (for all the states of VR $v_j$), $h \neq 0$, i (that isn't equal to the state i)

$a_{n_k m_l j_h}^{new} = a_{n_k m_l j_h}^{old} - \frac{1}{|N_j-1|}\frac{1}{|M_{n_k m_l j}^{old}|+1}$ For suspicious SL (the "super-user" receives an expression that got a sour indication)
The user's actions:
  A. Number of feedbacks by the user is updated, if the feedback was sent from a user $N_d^{user} = N_d^{user,old} + 1$.
  B. The user approves or disapproves the SL
    a. Approves: Nothing happens, the user who sent the feedback is downgraded:

$$U_d^{new} = U_d^{old} - \frac{1}{N_d^{user}}$$

(if the grade is 0 it stays that way)
    b. Disapproves: the user who sent the feedback is upgraded:

$$U_d^{new} = U_d^{old} + \frac{1}{N_d^{user}}.$$

Then we proceed to C:
  C. The super-user tags each element in the expression
  D. The super-user marks all the other VR that helped him make the decision for each VR. In other words, the question the "super user" is answering is as following: for each specific sign and state, what were the states that helped you tag it as you did.
The cells that were correct are enhanced by boosting them by a bit (until predefined threshold).
When the "super user" got a wrong answer and his/her job is to re-teach it, then the weights of certain parts are different:
  a. The trellis reaches the point where an observation was tagged incorrectly:
    a. If both $n_k$ and $m_l$ were tagged correctly and were supposed to affect $j_i$ which wasn't tagged correctly, then 50% of the difference between the wrong $a_{n_k m j_{not}}$ value is transferred to the correct on $a_{n_k m j_{yes}}$ and then 10% of the both $a_{n_k m j_{not}}^{new}$, $a_{n_k m j_{yes}}$ are transferred to $a_{n_k m j_0}$:

b. If both $n_k$ and $m_l$ were tagged correctly and were not supposed not to affect $j_i$ which wasn't tagged correctly, then 60% of the difference between the wrong $a_{n_k m_l j_{not}}$ value is transferred to the correct on a $a_{n_k m_l j_0}$.

c. The machine does another SL.

d. The super-user decides whether the SL was correct or incorrect:

i. Correct (dependent on LT): The process ends and for every a $a_{n_k m_l j_i}$ a. $a^{new}_{n_k m_l j_i} = a^{old}_{n_k m_l j_i} + \frac{1}{|M^{old}_{n_k m_l j}| + 1}$ b. $\forall h \in N_j$ (for all the states of VR $v_j$), $h \neq i$ (that isn't equal to the state i)

$a^{new}_{n_k m_l j_h} = a^{old}_{n_k m_l j_h} - \frac{1}{|N_j - 1|} \frac{1}{|M^{old}_{n_k m_l j}| + 1}$ ii. Incorrect: The process begins again from the beginning without the part of the user grade update.

Remark: for a new state that wasn't considered probable until the new learning session: $N_j$ is updated and thus the transitions matrix as well. The entire computation is done with the updated $N_j$.

2. Semi training: Here the involvement is lesser than the one of a super user. It is intended for trusted users, but not necessarily experts.

For correct tagging

The user's actions:

A. Clicks "v".

The machine's computation: If a certain observation that was, in fact VR $v_j$ was tagged as state i, then A. The repetition is updated: The same as before:

a. The number of times the VR $v_j$ appeared: $Rep^{new}(vr_j) = Rep^{old}(vr_j^i) = Rep^{old}(vr_j^i) + 1$ b. The number of times the VR $v_j$ appeared in state i: $Rep^{new}(vr_j^i) = Rep^{old}(vr_j^i) + 1$ B. The independent probabilities: The same as before:

a. The independent probability that $v_j$ is in state k is updated:

$b^{new}_i(vr_j) = b^{old}_i(vr_j) + \frac{1}{Rep^{old}(vr_j) + 1}$, or, in other words, $b^{new}_i(vr_j) = \frac{Rep^{new}(vr_j^i)}{Rep^{new}(vr_j)}$.

b. The independent probabilities that $v_j$ is in other states (all the nonzero states, off course): $\forall l \in N_j$ (for all the states of VR $vr_j$), $l \neq i$ (that isn't equal to the state i), $b^{new}_l(vr_j) = b^{old}_l(vr_j) - \frac{1}{|N^{ind}_j - 1|} \frac{1}{(Rep^{old}(rv_j) + 1)} \cdot |N^{ind}_j - 1|$ is the number of independent states possible for $vr_j$ excluding the state that has been chosen. As a consequence, $\sum_{l=1}^{N^{ind}_j} b^{new}_l(vr_j) = b^{new}_i(vr_j) + \sum_{l=1, l\neq i}^{N^{ind}_j} b^{new}_l(vr_j) = b^{old}_i(vr_j) + \frac{1}{Rep^{old}(vr_j) + 1} +$ $\sum_{l=1, l\neq i}^{N^{ind}_j} \left( b^{old}_l(vr_j) - \frac{1}{|N^{ind}_j - 1|} \frac{1}{(Rep^{old}(vr_j) + 1)} \right) =$ $b^{old}_i(vr_j) + \frac{1}{Rep^{old}(vr_j) + 1} - \frac{|N^{ind}_j - 1|}{|N^{ind}_j - 1|} \frac{1}{(Rep^{old}(vr_j) + 1)} +$ $\sum_{l=1, l\neq i}^{N^{ind}_j} (b^{old}_l(vr_j)) = b^{old}_i(vr_j) + \sum_{l=1, l\neq i}^{N^{ind}_j} (b^{old}_l(vr_j)) = \sum_{l=1}^{N^{ind}_j} b^{old}_l(vr_j) = 1$ and both are equal to 1. In the case that there is only one possible state, then no updating is done.

C. The transition matrix: The trellis that was picked is enhanced for every cell $a_{n_k m_l j_i}$ having a value of less than the LT:

a. $a^{new}_{n_k m_l j_i} = a^{old}_{n_k m_l j_i} + \frac{1}{|M^{old}_{n_k m_l j}| + 1}$ b. $\forall h \in N_j$ (for all the states of VR $v_j$), $h \neq i$ (that isn't equal to the state i)

$a^{new}_{n_k m_l j_h} = a^{old}_{n_k m_l j_h} - \frac{1}{|N_j - 1|} \frac{1}{|M^{old}_{n_k m_l j}| + 1}$ For incorrect tagging The user's actions:

A. Clicks "X".

B. The user is offered the SL outcomes of the other 4 leading trellises.

C. If non of them is correct, the user then corrects only the states, not the transition matrix.

The machine's computation: If a certain observation that was, in fact VR $v_j$ was tagged as state i, then A. The repetition is updated: The same as before:

a. The number of times the VR $vr_j$ appeared: $Rep^{new}(vr_j) = Rep^{old}(vr_j) + 1$ b. The number of times the VR $vr_j$ appeared in state i: $Rep^{new}(vr_j^i) = Rep^{old}(vr_j^i) + 1$ B. The independent probabilities: The same as before:

a. The independent probability that $vr_j$ is in state k is updated:

$b^{new}_i(vr_j) = b^{old}_i(vr_j) + \frac{1}{(Rep^{old}(vr_j) + 1)}$, or, in other words, $b^{new}_i(vr_j) = \frac{Rep^{new}(vr_j^i)}{Rep^{new}(vr_j)}$.

b. The independent probabilities that $vr_j$ is in other states (all the nonzero states, off course): $\forall l \in N_j$ (for all the states of VR $v_j$), $l \neq i$ (that isn't equal to the state i), $b^{new}_l(vr_j) = b^{old}_l(vr_j) - \frac{1}{|N^{ind}_j - 1|} \frac{1}{(Rep^{old}(vr_j) + 1)}$.

$|N^{ind}_j - 1|$ is the number of independent states possible for $vr_j$ excluding the state that has been chosen. As a consequence, $$\sum_{l=1}^{N_j^{ind}} b_l^{new}(vr_j) = b_i^{new}(vr_j) + \sum_{l=1,l\neq i}^{N_j^{ind}} b_l^{new}(vr_j) = b_i^{old}(vr_j) + \frac{1}{Rep^{old}(vr_j)+1} +$$

$$\sum_{l=1,l\neq i}^{N_j^{ind}} \left( b_l^{old}(vr_j) - \frac{1}{|N_j^{ind}-1|} \frac{1}{(Rep^{old}(vr_j)+1)} \right) =$$

$$b_i^{old}(vr_j) + \frac{1}{Rep^{old}(v_{rj})+1} - \frac{|N_j^{ind}-1|}{|N_j^{ind}-1|} \frac{1}{(Rep^{old}(vr_j)+1)} +$$

$$\sum_{l=1,l\neq i}^{N_j^{ind}} (b_l^{old}(vr_j)) = b_i^{old}(vr_j) + \sum_{l=1,l\neq i}^{N_j^{ind}} (b_l^{old}(vr_j)) = \sum_{l=1}^{N_j^{ind}} b_l^{old}(vr_j) = 1$$

and both are equal to 1. In the case that there is only one possible state, then no updating is done.

Scenarios:
a. If one of the SLs produced from the other leading trellises is picked:
b. If none of the SLs that were produced from the other leading trellises is picked then every $a_{n_k m_l j_i}$ is analyzed:
  i. If $n_k$, $m_l$ and $j_i$ were correct states (dependent on LT):

i. $a_{n_k m_l j_i}^{new} = a_{n_k m_l j_i}^{old} + \frac{1}{|M_{n_k m_l j}^{old}|+1}$ ii. $\forall h \square N_j$ (for all the states of VR $v_j$), h≠i (that isn't equal to the state i)

$a_{n_k m_l j_h}^{new} = a_{n_k m_l j_h}^{old} - \frac{1}{|N_j-1|} \frac{1}{|M_{n_k m_l j}^{old}|+1}$ ii. If $n_k$, $m_l$ were correct states, but $j_i$ wasn't: 25% of the difference between the wrong $a_{n_k m_l j_{not}}$ value is transferred to the correct on $a_{n_k m_l j_{yes}}$ and then 15% of both $a_{n_k m_l j_{not}}^{new}$, $a_{n_k m_l j_{yes}}^{new}$ are transferred to $a_{n_k m_l j_o}$ iii. If $n_k$ or $m_l$ were incorrect states and $j_i$ was a correct state or if $n_k$ or $m_l$ were incorrect states and $j_i$ was an incorrect state:
  1. It is assumed that $j_i^{correct}$ is dependent on all the other SL.
  2. As a result, for all the final, correct SL of $n_k$, $m_l$ a. $a_{n_k m_l j_i}^{new} = a_{n_k m_l j_i}^{old} + \frac{1}{|M_{n_k m_l j}^{old}|+1}$ b. $\forall h \in N_j$ (for all the states of VR $v_j$), h≠i (that isn't equal to the state i)

$a_{n_k m_l j_h}^{new} = a_{n_k m_l j_h}^{old} - \frac{1}{|N_j-1|} \frac{1}{|M_{n_k m_l j}^{old}|+1}$ While the invention has been described with respect to a limited number of embodiments, it will be appreciated that many variations, modifications and other applications of the invention may be made.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination. It will also be appreciated by persons skilled in the art that the present invention is not limited by what has been particularly shown and described hereinabove.

What is claimed is:

1. A method for searching through one or more documents for a match to a function, the method being performed by a computer, the method comprising:
   providing said function in a visual format to the computer, said function comprising a plurality of symbols, wherein said function comprises a scientific equation, said equation comprising at least one operator and at least one variable;
   analyzing said function, said analyzing comprising:
   decomposing the function into the plurality of symbols by the computer;
   labeling each symbol with a label by determining each character of the function;
   determining a plurality of possible labels for each character or combinations of characters;
   selecting a symbol label for each symbol according to said probabilistic model, wherein each symbol comprises a character or a plurality of characters;
   forming said one or more semantic connections according to each symbol label;
   determining a degree of probability for said one or more semantic connections and said symbol labels according to a probabilistic dynamic mathematical model by said computer, wherein said probabilistic model is state dependent, such that the function comprises a plurality of states, and wherein said selecting said symbol label further comprises determining an effect of each selected symbol label on each state of the function;
   analyzing said degree of probability for each of a plurality of semantic connections;
   if said degree of probability falls below a minimum threshold, analyzing one or more symbol labels having a degree of probability below a minimum threshold to determine whether to change said symbol label; and
   if a symbol label with a higher degree of probability is found according to said analyzing, changing said symbol label and reanalyzing one or more associated semantic connections and otherwise retaining a previously determined symbol label and associated semantic connection or connections; and
   searching through one or more documents for a match to the analyzed function, wherein said searching through one or more documents comprises determining a function match for a function in said one or more documents according to semantic similarity or identity.

2. The method of claim 1, wherein said mathematical model comprises a HMM (Hidden Markov Model), and wherein said providing the function comprises providing said symbols of the function in a predetermined order, or wherein said semantically analyzing the plurality of symbols further comprises determining a plurality of sets of possible semantic connections for the function, or a combination thereof.

3. The method of 1, wherein said mathematical model comprises a DHMM (Dynamic Hidden Markov Model) and wherein said semantically analyzing the plurality of symbols further comprises determining a single set of possible semantic connections for the symbols in the function.

4. The method of claim 1, further comprising providing a repository of a plurality of labels and symbols, wherein said selecting each symbol label further comprises comparing each character or combination of characters of the function to said repository.

5. The method of claim 4, wherein said providing said repository further comprises gathering a plurality of symbols; determining a plurality of labels for said symbols; and determining a plurality of semantic connections between said symbols according to a likelihood of an occurrence of said semantic connections.

6. The method of claim 1, wherein said providing the function further comprises providing an input comprising the function and one or more text words that are not part of the function; and separating the function from said one or more text words.

7. The method of claim 6, further comprising receiving a query comprising the function; and converting the function into a generic form.

8. The method of claim 7, wherein said determining said function match further comprises analyzing the function to determine one or more determinative features; and accepting said function match only if said function in said one or more documents comprises said one or more determinative features.

9. The method of claim 8, wherein said determining said function match further comprises analyzing the function to determine a plurality of features, each feature having a weighting; and weighting said function match according to a presence or absence of each feature in said function in said document.

10. The method of claim 8, wherein said searching through one or more documents comprises analyzing structured and unstructured data in said documents.

11. The method of claim 10, wherein said searching through one or more documents comprises indexing said documents to determine a presence of one or more functions.

12. The method of claim 11, wherein said query comprises one or more keywords and the function, and wherein said searching through one or more documents comprises separating said one or more keywords from the function.

13. The method of claim 12, wherein said searching through one or more documents further comprises searching for said one or more keywords in said documents; and ranking said function match also according to said one or more keywords.

14. The method of claim 13, wherein said searching for said one or more keywords in said documents comprising analyzing said one or more keywords to determine a scientific or mathematical category; determining whether said one or more documents comprises content in said scientific or mathematical category; and ranking said function match also according to said category determination.

15. The method of claim 14, wherein said searching through one or more documents further comprises categorizing said function to determine a scientific or mathematical category; determining whether said one or more documents comprises content in said scientific or mathematical category; and ranking said function match also according to said category determination.

16. The method of claim 15, wherein said providing the function further comprises providing a user interface on a computer; and entering the function through said user interface on said computer, wherein said user interface comprises a WYSIWYG (what you see is what you get) interface.

17. The method of claim 15, further comprising entering a query comprising a plurality of equations for performing a search, wherein said query comprises a function without a predefined syntax or order of symbols, wherein the function comprises a mathematical function in which at least one symbol is not alphanumeric or a type of punctuation selected from the group consisting of a comma, period, question mark, exclamation point, colon, semi-colon, single or double glyphs (quotation marks).

18. A method for searching through one or more documents for a match to a function comprising a plurality of symbols, the method being performed by a computer, the method comprising: providing the function in a visual format to the computer; decomposing the function into the plurality of symbols by the computer; semantically analyzing the plurality of symbols to determine one or more semantic connections between the plurality of symbols according to a mathematical model by the computer, and searching through one or more documents for a match to the semantically analyzed function;
wherein the function comprises a mathematical equation, said equation comprising at least one operator and at least one variable, wherein said mathematical model comprises a dynamic mathematical model, wherein said dynamic mathematical model comprises a probabilistic model and wherein said semantically analyzing comprises determining said one or more semantic connections according to a degree of probability according to said probabilistic model;
wherein said determining said one or more semantic connections comprises labeling each symbol with a label;
forming said one or more semantic connections according to each symbol label;
determining a degree of probability for said one or more semantic connections and said symbol labels according to said probabilistic model;
analyzing said degree of probability for each of a plurality of semantic connections;
if said degree of probability falls below a minimum threshold, analyzing one or more symbol labels having a degree of probability below a minimum threshold to determine whether to change said symbol label;
if a symbol label with a higher degree of probability is found according to said analyzing, changing said symbol label and reanalyzing one or more associated semantic connections and otherwise retaining a previously determined symbol label and associated semantic connection or connections;
wherein said searching through one or more documents comprises determining a function match for a function in said one or more documents according to semantic similarity or identity.

19. A method for searching through one or more documents for a match to a function, the method being performed by a computer, the method comprising:
providing the function in a visual format to the computer, said function comprising a plurality of symbols, wherein the function comprises a mathematical equation, said equation comprising at least one operator and at least one variable;
analyzing said function, said analyzing comprising; decomposing the function into the plurality of symbols by the computer;
semantically analyzing the plurality of symbols to determine one or more semantic connections between the plurality of symbols according to a dynamic mathematical model by the computer, and
searching through one or more documents for a match to the semantically analyzed function;
wherein said dynamic mathematical model comprises a probabilistic model and wherein said semantically analyzing comprises determining said one or more semantic connections according to a degree of probability according to said probabilistic model;

wherein said determining said one or more semantic connections comprises labeling each symbol with a label by determining each character of the function;
determining a plurality of possible labels for each character or combinations of characters;
and selecting a symbol label for each symbol according to said probabilistic model, wherein each symbol comprises a character or a plurality of characters;
forming said one or more semantic connections according to each symbol label;
determining a degree of probability for said one or more semantic connections and said symbol labels according to said probabilistic model;
analyzing said degree of probability for each of a plurality of semantic connections;
if said degree of probability falls below a minimum threshold, analyzing one or more symbol labels having a degree of probability below a minimum threshold to determine whether to change said symbol label; and
if a symbol label with a higher degree of probability is found according to said analyzing, changing said symbol label and reanalyzing one or more associated semantic connections and otherwise retaining a previously determined symbol label and associated semantic connection or connections;
wherein said searching through one or more documents comprises determining a function match for a function in said one or more documents according to semantic similarity or identity.

* * * * *